US012687842B2

(12) United States Patent

SayyarRodsari et al.

(10) Patent No.: US 12,687,842 B2

(45) Date of Patent: Jul. 21, 2026

(54) SYSTEMS AND METHODS FOR MONITORING AND ADJUSTING OPERATION OF A MOVER SYSTEM

(71) Applicant: Rockwell Automation Technologies, Inc., Mayfield Heights, OH (US)

(72) Inventors: Bijan SayyarRodsari, Austin, TX (US); Jakob Methfessel, Muskego, WI (US); Shankha S. Seal, Milwaukee, WI (US); Jadav Das, Waltham, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 806 days.

(21) Appl. No.: 17/947,779

(22) Filed: Sep. 19, 2022

(65) Prior Publication Data

US 2024/0094718 A1      Mar. 21, 2024

(51) Int. Cl.
G05B 19/4155      (2006.01)
A43D 8/02      (2006.01)
(Continued)

(52) U.S. Cl.
CPC .................... G05B 19/4189 (2013.01); G05B 2219/35499 (2013.01); G05B 2219/45054 (2013.01)

(58) Field of Classification Search
CPC ...... G05B 19/4189; G05B 2219/35499; G05B 2219/45054; G05B 19/042; G05B 2219/31467; G05B 19/406; G05B 23/0218; G05B 2219/31432; G05B 2219/31474; B60L 3/0023; B60L 13/03; G06Q 50/04; H02P 29/024; B65G 54/02
See application file for complete search history.

(56) References Cited

U.S. PATENT DOCUMENTS 10,599,982 B2      3/2020  Pal et al.
10,879,831 B1 *   12/2020  Nagel ................ G05B 13/0265
(Continued)

FOREIGN PATENT DOCUMENTS

CN      111930081 A    11/2020

OTHER PUBLICATIONS

Extended European Search Report for Application No. 23184131.3 mailed Feb. 16, 2024, 11 pages.

*Primary Examiner* — Robert E Fennema
*Assistant Examiner* — Magdalena I Kossek
(74) *Attorney, Agent, or Firm* — Fletcher Yoder, P.C.

(57)      ABSTRACT

A non-transitory computer-readable medium includes instructions that, when executed by processing circuitry, are configured to cause the processing circuitry to receive a first dataset associated with a mover system having a track and a plurality of mover assemblies independently movable along the track, identify a subset of the first dataset associated with a normal operating state of the mover system based on state data associated with the mover system, receive a second dataset associated with the mover system after receiving the first dataset and having a first set of differences from the subset of the first dataset, determine whether the second dataset is indicative of an anomaly state of the mover system based on a relationship between an anomaly signature dataset and the second dataset, and adjusting operation of the mover system in response to determining that the second dataset corresponds to the anomaly signature dataset.

20 Claims, 7 Drawing Sheets

(51) Int. Cl.

| | | |
|---|---|---|
| *B21B 37/18* | (2006.01) | |
| *B21B 37/28* | (2006.01) | |
| *B21B 37/60* | (2006.01) | |
| *B21B 37/66* | (2006.01) | |
| *B21B 38/04* | (2006.01) | |
| *B21B 38/08* | (2006.01) | |
| *G05B 19/418* | (2006.01) | |

(56) References Cited

U.S. PATENT DOCUMENTS

| | | | |
|---|---|---|---|
| 11,036,191 B2 | 6/2021 | Ooba et al. | |
| 11,054,808 B2 | 7/2021 | Wynne et al. | |
| 2005/0125710 A1* | 6/2005 | Sanghvi | G06F 11/3017 |
| | | | 714/39 |
| 2013/0060524 A1* | 3/2013 | Liao | G05B 23/0254 |
| | | | 702/182 |
| 2017/0235292 A1* | 8/2017 | Wernersbach | G05B 19/0428 |
| | | | 700/81 |
| 2018/0370734 A1* | 12/2018 | Ziegler | G01G 11/003 |
| 2019/0077608 A1* | 3/2019 | Huang | B65G 43/02 |
| 2019/0084153 A1 | 3/2019 | Witt | |
| 2019/0097552 A1* | 3/2019 | Das | H02P 6/006 |
| 2019/0339685 A1 | 11/2019 | Cella et al. | |
| 2020/0103894 A1 | 4/2020 | Cella et al. | |
| 2020/0133254 A1 | 4/2020 | Cella et al. | |
| 2020/0371522 A1* | 11/2020 | Wernersbach | H04B 7/04 |
| 2022/0027529 A1* | 1/2022 | Zarur | G06F 30/12 |
| 2022/0177061 A1* | 6/2022 | Lauer | B62D 65/18 |
| 2023/0305551 A1* | 9/2023 | Koh | G05B 23/024 |

* cited by examiner

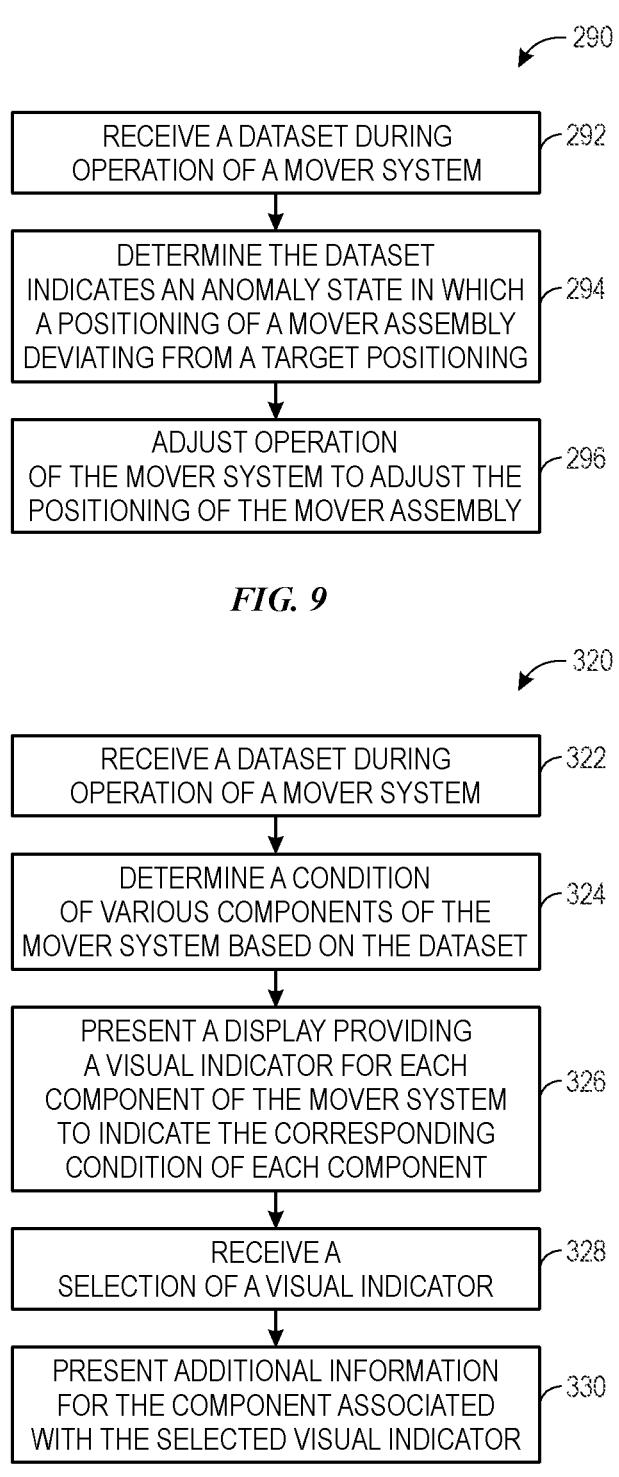

290

RECEIVE A DATASET DURING
OPERATION OF A MOVER SYSTEM — 292

DETERMINE THE DATASET
INDICATES AN ANOMALY STATE IN WHICH
A POSITIONING OF A MOVER ASSEMBLY
DEVIATING FROM A TARGET POSITIONING — 294

ADJUST OPERATION
OF THE MOVER SYSTEM TO ADJUST THE
POSITIONING OF THE MOVER ASSEMBLY — 296

RECEIVE A DATASET DURING
OPERATION OF A MOVER SYSTEM — 322

DETERMINE A CONDITION
OF VARIOUS COMPONENTS OF THE
MOVER SYSTEM BASED ON THE DATASET — 324

PRESENT A DISPLAY PROVIDING
A VISUAL INDICATOR FOR EACH
COMPONENT OF THE MOVER SYSTEM
TO INDICATE THE CORRESPONDING
CONDITION OF EACH COMPONENT — 326

RECEIVE A
SELECTION OF A VISUAL INDICATOR — 328

PRESENT ADDITIONAL INFORMATION
FOR THE COMPONENT ASSOCIATED
WITH THE SELECTED VISUAL INDICATOR — 330

FIG. 10

SYSTEMS AND METHODS FOR MONITORING AND ADJUSTING OPERATION OF A MOVER SYSTEM

BACKGROUND

The present disclosure generally relates to control systems and, more particularly, to a control system that may monitor and adjust operation of a mover system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Different industries, such as manufacturing, filling, food, beverage, packaging, and material handling applications, may utilize a mover system. The mover system may include a track and multiple mover assemblies that may move along the track to transport various objects or products around the track. The mover system may include a control system, which may control the mover assemblies to facilitate performance of an industrial automation process via the mover system. For example, the control system may determine a control action and instruct the mover assemblies to perform the control action, such as by independently controlling movement of each mover assembly. Unfortunately, in some circumstances, the mover system may not operate as desired. As an example, movement and/or positioning of a mover assembly may be undesirable. Thus, the process performed by the mover system may also be undesirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer-readable medium includes instructions that, when executed by processing circuitry, are configured to cause the processing circuitry to receive a first dataset associated with a mover system having a track and a plurality of mover assemblies independently movable along the track, identify a subset of the first dataset associated with a normal operating state of the mover system based on state data associated with the mover system, receive a second dataset associated with the mover system after receiving the first dataset and having a first set of differences from the subset of the first dataset, determine whether the second dataset is indicative of an anomaly state of the mover system based on a relationship between an anomaly signature dataset and the second dataset, and adjusting operation of the mover system in response to determining that the second dataset corresponds to the anomaly signature dataset.

In an embodiment, a method includes receiving, via processing circuitry, an anomaly state model for a mover system having a track and a plurality of mover assemblies independently movable along the track. The anomaly state model includes a plurality of signatures, and each signature of the plurality of signatures is indicative of an anomaly state of the mover system. The method also includes receiving, via the processing circuitry, a sensor dataset during operation of the mover system, determining, via the processing circuitry, the sensor dataset corresponds to a signature of the plurality of signatures of the anomaly state model, determining, via the processing circuitry, an adjustment operation of the mover system based on the signature, and adjusting, via the processing circuitry, the operation of the mover system in accordance with the adjustment operation.

In an embodiment, a mover system includes a track, a plurality of mover assemblies configured to move along the track independently of one another, and a control system configured to receive a first dataset, identify a subset of the first dataset associated with a normal operating state of the mover system based on state data associated with the mover system, receive a second dataset during operation of the mover system, determine the second dataset comprises a set of differences from the subset of the first dataset, determine the second dataset corresponds to a signature indicative of an anomaly state, and adjust the operation of the mover system in response to determining the second dataset includes the set of differences from the subset of the first dataset and determining the second dataset corresponds to the signature

DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 9 is a flowchart of an embodiment of a method for adjusting operation of a mover system, in accordance with an aspect of the present disclosure; and FIG. 10 is a flowchart of an embodiment of a method for providing a display based on operation of a mover system, in accordance with an aspect of the present disclosure.

DETAILED DESCRIPTION

Figure 1:
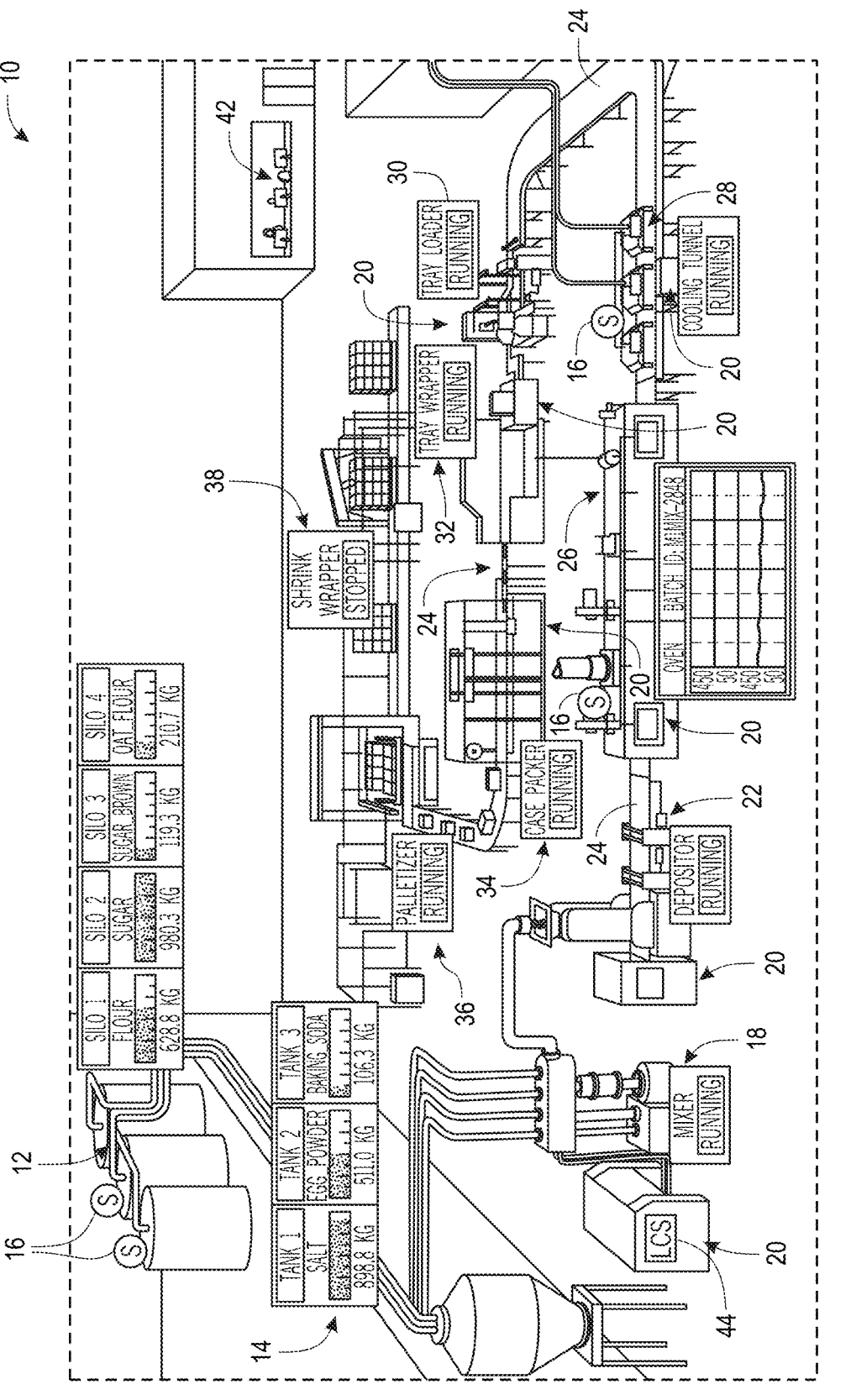
FIG. 1 is a schematic diagram of an embodiment of an industrial automation system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.\

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

An industrial automation system may employ different equipment to perform an industrial automation process. For example, the industrial automation system may include any suitable system, such as a manufacturing plant, a resource extraction system, a hydrocarbon extraction site, a chemical refinery facility, an industrial plant, a power generation system, a mining system, a brewery, or the like. The industrial automation system may include a mover system (e.g., an independent cart system) that may operate to transport objects to different areas of the industrial automation system. As an example, the mover system may include a track, as well as multiple mover assemblies (e.g., carts) that may each receive an object and move along the track, thereby moving the object to a different portion of the track to transport the object. The mover system may include and/or be communicatively coupled to a control system. The control system may operate the mover system to control movement of the mover assemblies. In some embodiments, the control system may control movement of the mover assemblies independently from one another. That is, for example, the control system may cause the mover assemblies to move relative to one another, such as at different speeds, at different accelerations, in different directions, and so forth. Thus, positioning of the mover assemblies, and therefore of the objects transported by the mover assemblies, may be more acutely controlled.

Unfortunately, in some circumstances, operation of the mover system may not be desirable. As an example, positioning and/or movement of one of the mover assemblies may be undesirable. For instance, such undesirable positioning and/or movement may be caused by a fault associated with the track (e.g., a formation on a portion of the track), a fault associated with a mover assembly (e.g., wear of the mover assembly), a fault associated with the control system (e.g., interruption of a control signal transmitted from the control system to the mover assembly), and so forth. As a result, operation of the industrial automation system, such as transportation and positioning of objects, may also be affected.

Therefore, it is presently recognized that improvements to operate the mover system, such as to block or mitigate undesirable positioning and/or movement of the mover assemblies, are desirable. Accordingly, embodiments of the present disclosure are directed to a control system that may identify an anomaly state of a mover system and adjust operation of the mover system in response to identifying the anomaly state. As an example, the control system may initially receive a first dataset and identify a subset of the first dataset is associated with a normal operating state of the mover system. The control system may also receive a second dataset and establish a signature indicative of an anomaly state based on the second dataset. The control system may then receive sensor data during operation of the mover system to transport objects. In response to determining the sensor data matches with or includes (e.g., does not have a set of differences from) the first dataset, the control system may determine that the mover system is in the normal operating state. However, in response to determining the sensor data corresponds to the signature indicative of the anomaly state (e.g., the sensor data matches a subset of the second dataset), the control system may determine that the mover system is in the anomaly state. As a result, the control system may adjust operation of the mover system, such as in accordance with an adjustment operation associated with the signature. For instance, the control system may adjust positioning of a mover assembly, such as to position the mover assembly in a manner that blocks the mover assembly from affecting (e.g., impeding) movement of other mover assemblies.

In some circumstances, the control system may determine that the sensor data includes a set of differences from the first dataset and also does not correspond to the signature, thereby indicating that the mover system may be in an unknown state, such as an unknown anomaly state. In response, the control system may adjust operation of the mover system in a different manner, such as to suspend operation of the mover system. Thus, the control system may avoid continual operation of the mover system in the unknown state, which may otherwise affect components (e.g., a structural integrity of the components, an operation of the components) of the mover system. The control system may further receive feedback, such as from a user input, associating the sensor data with a new signature indicative of an anomaly state. The control system may then establish the new signature based on the user input. Thus, the control system may reference the new signature to identify whether subsequently received sensor data corresponds to the newly established signature. In this manner, the control system may update the signatures indicative of an anomaly state to identify anomaly states more effectively.

Furthermore, in some embodiments, the control system may identify the subset of the first dataset associated with the normal operating state based on operation of the mover system in a calibration mode. By way of example, the mover system may be arranged in a desirable manner in the calibration mode such that operation of the mover system in the calibration mode is representative of normal, desirable, or target operation of the mover system. The control system may operate the mover system for a threshold number of cycles in the calibration mode, in which the mover assemblies may complete a circuit or path of travel along the track for each cycle, and the control system may receive data (e.g., sensor data) during operation of the mover system in the calibration mode. The control system may then associate such received data with the normal operating state. In this manner, the control system may readily identify the subset of the first dataset associated with the normal operating state for different embodiments of mover systems. For example, different mover systems may include different datasets associated with their respective normal operating states, and the control system may operate each of the mover systems in a corresponding calibration mode to identify such datasets. In this manner, a single embodiment of the control system may be able to establish the normal operating states of and monitor the operation of different embodiments of mover systems. That is, manufacture of multiple control system embodiments, each specifically arranged to monitor a particular mover system embodiment, may be avoided. Therefore, ease of implementation of control systems to monitor and/or adjust operation of different mover systems may be improved. Although the present disclosure primarily discusses implementations in an industrial automation system, the features and techniques described herein may be applied to any other suitable application and context.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as an automotive industry, a mining industry, a hydrocarbon production industry, a manufacturing industry, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed switches, fixed-managed switches, service-router switches, industrial switches, unmanaged switches), and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may provide power to the machinery used to perform certain tasks, provide protection to the machinery from electrical surges, monitor the operations of the respective device, communicate data regarding the respective device to a supervisory control system 42, and the like. In some embodiments, each industrial automation device 20 or a group of industrial automation devices 20 may be controlled using a local control system 44 of the supervisory control system 42. The local control system 44 may include receive data regarding the operation of the respective industrial automation device 20, other industrial automation devices 20, user inputs, and other suitable inputs to control the operations of the respective industrial automation device(s) 20.

Figure 2:
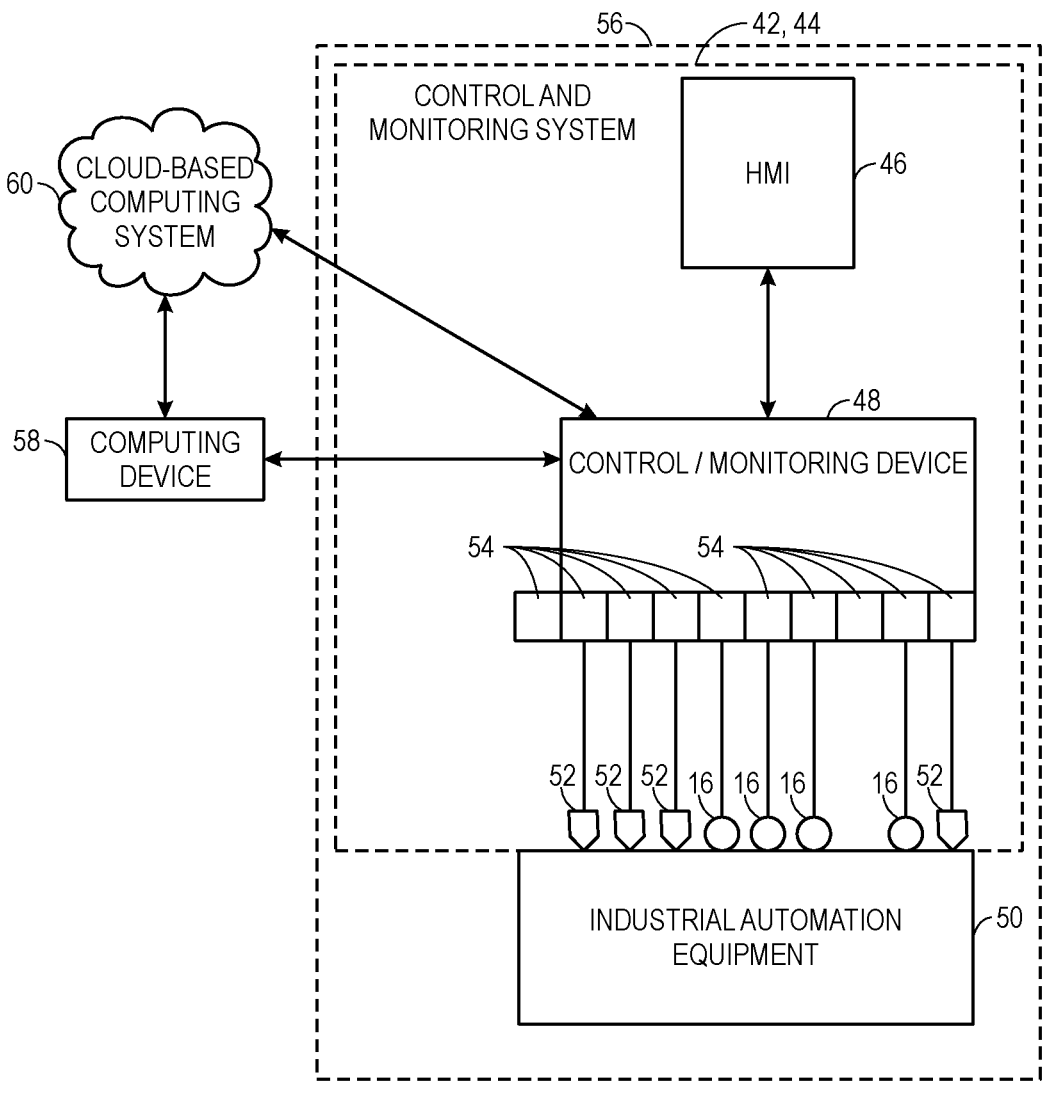
FIG. 2 is a schematic diagram of an embodiment of a control and monitoring system that may be employed in any suitable industrial automation system, in accordance with an aspect of the present disclosure.

By way of example, FIG. 2 is a schematic diagram of an exemplary control system 42, 44 that may be employed in any suitable industrial automation system 10, in accordance with embodiments presented herein. In FIG. 2, the control system 42, 44 is illustrated as including a human machine interface (HMI) 46 and a control/monitoring device 48 (e.g., control circuitry, an automation controller, an electronic controller, a programmable controller) adapted to interface with devices that may monitor and control various types of industrial automation equipment 50. As discussed above, the industrial automation equipment 50 may take many forms and include devices for accomplishing many different and varied purposes. For example, the industrial automation equipment 50 may include machinery used to perform various operations in a compressor station, an oil refinery, a batch operation for making food items, a mechanized assembly line, and so forth. Accordingly, the industrial automation equipment 50 may include a variety of operational components, such as electric motors, valves, actuators, temperature elements, pressure sensors, or a myriad of machinery or devices used for manufacturing, processing, material handling, and other applications. Additionally, the industrial automation equipment 50 may include various types of equipment that may be used to perform the various operations that may be part of an industrial application. For instance, the industrial automation equipment 50 may include the mixer 18, the depositor 22, the conveyor 24, the oven 26, or other pieces of machinery described in FIG. 1. Moreover, the industrial automation equipment 50 may include devices used in other applications, such as electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like.

It should be noted that the HMI 46 and the control/ monitoring device 48, in accordance with embodiments of the present techniques, may be facilitated by the use of certain network strategies. Indeed, any suitable industry standard network or network may be employed, such as DeviceNet, to enable data transfer. Such networks permit the exchange of data in accordance with a predefined protocol and may provide power for operation of networked elements.

In certain embodiments, one or more properties of the industrial automation equipment 50 may be monitored and controlled by certain equipment for regulating control variables used to operate the industrial automation equipment 50. For example, the sensors 16 and/or actuators 52 may monitor various properties of the industrial automation equipment 50 and may provide data to the local control system 44, which may adjust operations of the industrial automation equipment 50, respectively.

In some cases, the industrial automation equipment 50 may be associated with devices used by other equipment. For instance, scanners, gauges, valves, flow meters, and the like may be disposed on industrial automation equipment 50. Here, the industrial automation equipment 50 may receive data from the associated devices and use the data to perform their respective operations more efficiently. For example, a controller (e.g., the control/monitoring device 48) of a motor drive may receive data regarding a temperature of a connected motor and may adjust operations of the motor drive based on the data. As another non-limiting example, the control/monitoring device 48 of an assembly component may receive data regarding an abnormality in a product (e.g., a scratch, a wrinkle, an unpolished spot) and may adjust operations of an assembly component to remove the abnormality from the product (e.g., buffing out a scratch, applying a new coat of paint, adjusting or stretching fabric to remove a wrinkle, replacing a portion of the product).

In certain embodiments, the industrial automation equipment 50 may include a communication component that enables the industrial automation equipment 50 to communicate data between each other and other devices. The communication component may include a network interface that may enable the industrial automation equipment 50 to communicate via various protocols such as Ethernet/IP®, ControlNet®, DeviceNet®, or any other industrial communication network protocol. Alternatively, the communication component may enable the industrial automation equipment 50 to communicate via various wired or wireless communication protocols, such as Wi-Fi, mobile telecommunications technology (e.g., 2G, 3G, 4G, 5G, Long-Term Evolution), Bluetooth®, near-field communications technology, and the like.

The sensors 16 may include any number of devices adapted to provide information regarding process conditions. The actuators 52 may include any number of devices adapted to perform a mechanical action in response to a signal from a controller (e.g., the control/monitoring device 48). The sensors 16 and/or actuators 52 may be utilized to operate the industrial automation equipment 50. Indeed, the sensors 16 and/or actuators 52 may be utilized within process loops that are monitored and controlled by the control/monitoring device 48 and/or by the HMI 46. Such a process loop may be activated based on process input data (e.g., input from a sensor 16) and/or direct operator input received through the HMI 46. As illustrated, the sensors 16 and actuators 52 are in communication with the control/ monitoring device 48. Further, the sensors 16 and/or actuators 52 may be assigned a particular address in the control/ monitoring device 48 and receive power from the control/ monitoring device 48 and/or attached modules.

Input/output (I/O) modules 54 may be added or removed from the control system 42, 44 via expansion slots, bays or other suitable mechanisms. In certain embodiments, the I/O modules 54 may be included to add functionality to the control/monitoring device 48 or to accommodate additional process features. For instance, the I/O modules 54 may communicate with new sensors 16 and/or actuators 52 added to monitor and control the industrial automation equipment 50. It should be noted that the I/O modules 54 may communicate directly to sensors 16 and/or actuators 52 through hardwired connections or may communicate through wired or wireless sensor networks, such as Hart or IOLink.

Generally, the I/O modules 54 serve as an electrical interface to the control/monitoring device 48 and may be located proximate or remote from the control/monitoring device 48, including at remote network interfaces to associated systems. In such embodiments, data may be communicated with remote modules over a common communication link, or network, wherein modules on the network communicate via a standard communications protocol. Many industrial controllers can communicate via network technologies, such as Ethernet (e.g., IEEE702.3, TCP/IP, UDP, Ethernet/IP), ControlNet, DeviceNet, or other network protocols (e.g., Foundation Fieldbus (H1 and Fast Ethernet), Modbus TCP, Profibus) and also communicate to higher level computing systems.

In the illustrated embodiment, several of the I/O modules 54 may transfer input and output signals between the control/monitoring device 48 and the industrial automation equipment 50. As illustrated, the sensors 16 and actuators 52 may communicate with the control/monitoring device 48 via one or more of the I/O modules 54 coupled to the control/ monitoring device 48.

In certain embodiments, the control system 42, 44 (e.g., the HMI 46, the control/monitoring device 48, the sensors 16, the actuators 52, the I/O modules 54) and the industrial automation equipment 50 may be a part of an industrial automation application 56. The industrial automation application 56 may involve any type of industrial process or system used to manufacture, produce, process, or package various types of items. For example, the industrial automation applications 56 may include industries such as material handling, packaging industries, manufacturing, processing, batch processing, the example industrial automation system 10 of FIG. 1, and the like.

The control/monitoring device 48 may also be communicatively coupled to a computing device 58 and a cloud-based computing system 60. In this network, input and output signals generated from the control/monitoring device 48 may be communicated between the computing device 58 and the cloud-based computing system 60. Although the control/monitoring device 48 may be capable of communicating with the computing device 58 and the cloud-based computing system 60, as mentioned above, in certain embodiments, the control/monitoring device 48 (e.g., the local computing system 44) may perform certain operations and analysis without sending data to the computing device 58 or to the cloud-based computing system 60.

Figure 3:
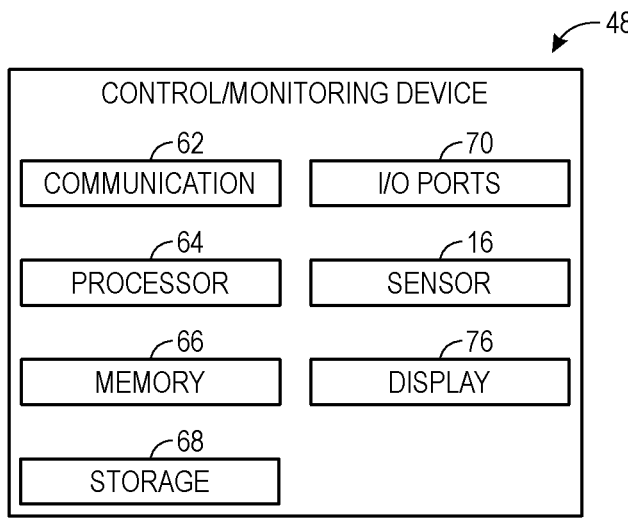
FIG. 3 is a schematic diagram of an embodiment of a control/monitoring device employed by a control system for an industrial automation system, in accordance with an aspect of the present disclosure.

FIG. 3 illustrates example components that may be part of the control/monitoring device 48, the local control system 44, the supervisory control system 42, or any other suitable computing device that implement embodiments presented herein. For example, the control/monitoring device 48 may include a communication component 62, a processor 64 (e.g., processing circuitry), a memory 66, a storage 68, input/output (I/O) ports 70, the sensor 16 (e.g., an electronic data sensor, a temperature sensor, a vibration sensor, a camera), a display 76, and the like. The communication component 62 may be a wireless or wired communication component that may facilitate communication between the industrial automation equipment 50, the control/monitoring device 48, additional industrial automation equipment 50, and/or other communication capable devices.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that include monitoring operations of the industrial automation equipment, identifying anomalies in sensor data measured by the sensor 16, and so forth.

The memory 66 and the storage 68 may also be used to store the data, the analysis of the data, the software applications, and the like. For example, the memory 66 and the storage 68 may store instructions associated with implementing different levels of processing for various operations. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

In one embodiment, the memory 66 and/or storage 68 may include a software application that may be executed by the processor 64 and may be used to monitor, control, access, and/or view one of the industrial automation equipment 50. As such, the computing device 58 may communicatively couple to industrial automation equipment 50 or to a respective computing device of the industrial automation equipment 50 via a direct connection between the devices and/or via the control/monitoring device 48. The software application may perform various functionalities, such as track statistics of the industrial automation equipment 50, store reasons for placing the industrial automation equipment 50 offline, determine reasons for placing the industrial automation equipment 50 offline, secure industrial automation equipment 50 that is offline, deny access to place an offline industrial automation equipment 50 back online until certain conditions are met, and so forth.

The I/O ports 70 may be interfaces that may couple to other peripheral components such as input devices (e.g., a keyboard, a mouse), sensors, I/O modules (e.g., the I/O modules 54), and the like. I/O modules may enable the control/monitoring devices 48 to communicate with the industrial automation equipment 50 and/or other devices in the industrial automation system.

The display 76 may depict visualizations associated with software or executable code being processed by the processor 64. In one embodiment, the display 76 may be a touch display capable of receiving inputs (e.g., parameter data for operating the industrial automation equipment 50) from a user of the control/monitoring device 48. As such, the display 76 may serve as a user interface to communicate with the industrial automation equipment 50. The display 76 may display a graphical user interface (GUI) for operating the industrial automation equipment 50, for tracking the maintenance of the industrial automation equipment 50, and the like. The display 76 may be any suitable type of display, such as a liquid crystal display (LCD), plasma display, or an organic light emitting diode (OLED) display, for example. Additionally, in one embodiment, the display 76 may be provided in conjunction with a touch-sensitive mechanism (e.g., a touch screen) that may function as part of a control interface for the industrial automation equipment 50 or for a number of pieces of industrial automation equipment 50 in the industrial automation application 56 to control the general operations of the industrial automation application 56. In some embodiments, the operator interface may be characterized as the HMI 46, a human-interface machine, or the like implemented via the display 76.

Although the components described above have been discussed with regard to the control/monitoring device 48, the local control system 44, and the supervisory control system 42, it should be noted that similar components may make up other computing devices described herein. Further, it should be noted that the listed components are provided as example components, and the embodiments described herein are not to be limited to the components described with reference to FIG. 3. For example, the industrial automation equipment 50 may include the communication component 62, the processor 64, the memory 66, the storage 68, the I/O ports 70, and/or the display 76.

Referring back to FIG. 2, in operation, the industrial automation application 56 may receive one or more inputs used to produce one or more outputs. For example, the inputs may include feedstock, electrical energy, fuel, parts, assemblies, sub-assemblies, operational parameters (e.g., sensor measurements), or any combination thereof. Additionally, the outputs may include finished products, semi-finished products, assemblies, manufacturing products, by products, or any combination thereof.

To produce the one or more outputs used to control the industrial automation equipment 50, the control/monitoring device 48 may output control signals to instruct the industrial automation equipment 50 to perform a control action by implementing manipulated variable set points. For example, the control/monitoring device 48 may instruct a motor (e.g., an industrial automation device 20) to implement a control action by actuating at a particular operating speed (e.g., a manipulated variable set point).

In some embodiments, the control/monitoring device 48 may determine the manipulated variable set points based at least in part on process data. As described above, the process data may be indicative of operation of the industrial automation device 20, of the industrial automation equipment 50, of the industrial automation application 56, and the like. As such, the process data may include operational parameters of the industrial automation device 20 and/or operational parameters of the industrial automation application 56. For example, the operational parameters may include any suitable type of measurement or control setting related to operating respective equipment, such as temperature, flow rate, electrical power, and the like.

Thus, the control/monitoring device 48 may receive process data from one or more of the industrial automation devices 20, the sensors 16, or the like. In some embodiments, the sensor 16 may determine an operational parameter and communicate a measurement signal indicating the operational parameter to the control/monitoring device 48. For example, a temperature sensor may determine temperature of a motor (e.g., an industrial automation device 20) and transmit a measurement signal indicating the determined temperature to the control/monitoring device 48. The control/monitoring device 48 may then analyze the process data to monitor performance of the industrial automation application 56 (e.g., determine an expected operational state) and/or perform diagnostics on the industrial automation application 56.

To facilitate controlling operation and/or performing other functions, the control/monitoring device 48 may include one or more controllers, such as one or more model predictive control (MPC) controllers, one or more proportional-integral-derivative (PID) controllers, one or more neural network controllers, one or more fuzzy logic controllers, or any combination thereof. In some embodiments, the control/monitoring device 48 may provide localized control over a portion of the industrial automation application 56. For example, in the depicted embodiment of FIG. 1, the local control system 44 that may be part of the mixer 18 may include the control/monitoring device 48, which may provide control over operation of a first automation device 20 that controls the mixer 18, while a second local control system 44 may provide control over operation of a second automation device 20 that controls the operation of the depositor 22.

On the other hand, the supervisory control system 42 may provide centralized control over operation of the industrial automation application 56. For example, the supervisory control system 42 may enable centralized communication with a user (e.g., operator). To facilitate, the display 76 of the supervisory control system 42 may provide information to the user. For example, the display 76 may display visual representations of information, such as process data, selected features, expected operational parameters, and/or relationships therebetween. The local control system 44 may control operation of a portion of the industrial automation application 50 based at least in part on the control strategy determined by the supervisory control system 42. Additionally, the supervisory control system 42 may determine the control strategy based at least in part on process data determined by the local control system 44. Thus, to implement the control strategy, the supervisory control system 42 and the local control systems 44 may communicate with one another via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

Figure 4:
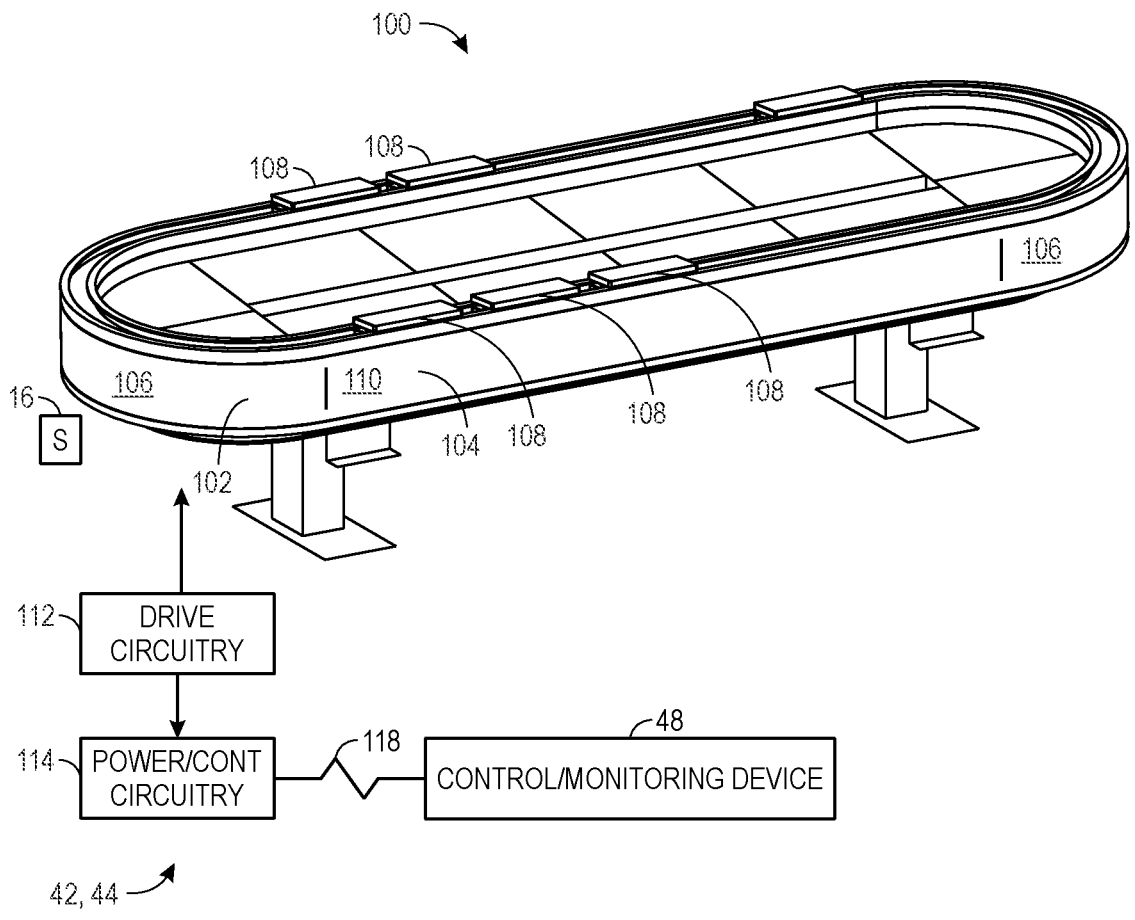
FIG. 4 is a perspective view of an embodiment of a mover system having mover assemblies positioned for movement along a track, in accordance with an aspect of the present disclosure.

Keeping the foregoing in mind, FIG. 4 is a perspective view of an embodiment of a mover system 100 (e.g., the conveyor 24) that may be employed by the industrial automation system 10 and controlled by the control system 42, 44 to move articles or products around a track 102. As will be appreciated by those skilled in the art, in many applications, the mover system 100 may inter-operate with other machines, robots, conveyers, control equipment, and so forth (not separately shown) in an overall automation, packaging, material handling or other application. In the illustrated embodiment, the track 102 includes multiple straight track sections 104 and multiple curved track sections 106. These track sections 104, 106 may be generally self-contained and mountable in various physical configurations, such as in the oval illustrated in FIG. 1. It should be noted that other configurations are also possible as discussed below. The configurations may form closed loops of various shapes but may also include open-ended segments.

The mover system 100 may also include one or more mover assemblies 108, which may be mounted to and movable along the track 102. The position, velocity, acceleration, and/or higher order derivative parameters may be controllable for these mover assemblies 108. The mover assemblies 108 may interact with stationary elements in and around an outer periphery 110 of the track 106, although other configurations are envisaged. Each mover assembly 108 may include a mounting platform. Various tools, holders, support structures, loads, and so forth may be mounted to this mounting platform. The mover assemblies 108 themselves may be configured differently from those shown in order accommodate the various loads. While a horizontal configuration is illustrated in FIG. 1, other orientations may also be provided, such as ones in which the illustrated oval is generally stood on a side or end, or at any angle.

The control system 42, 44 may position, accelerate, decelerate, and generally move the mover assemblies 108 under the influence of controlled magnetic and electromagnetic fields. For example, drive circuitry 112 of the control system 42, 44 may provide signals to each track section 104, 106, and specifically to individual coils of the track sections 104, 106, to create electromotive forces that interact with magnets on the track sections 104, 106 to drive the mover assemblies 108 to specific locations and/or at specific velocity, accelerations, and so forth. The drive circuitry 112 may typically include inverter circuitry that makes use of power electronic switches to provide drive power to the individual coils of each section in a controlled manner. In some embodiments, the drive circuitry 112 may be included in each individual track section 104, 106. Power and control circuitry 114 of the control system 42, 44 may provide signals (e.g., control signals) to the drive circuitry 112. The control/monitoring device 48 may be linked to the mover system 100 by one or more networks 118. During operation, the control/monitoring device 48 may allow for coordination of the operation of the mover system 100 with other automation components, machine systems, manufacturing and material handling machines, and so forth. For example, the control/monitoring device 48 may receive data from the sensors 16 to detect various features, such as the location, position, orientation, velocity, acceleration, and so forth, of each individual mover assembly 108 and output control signals to the power and control circuitry 114 to control operation of the drive circuitry 112 to move the mover assemblies 108.

In certain embodiments, the control/monitoring device 48 may independently control each mover assembly 108. That is, the control/monitoring device 48 may regulate the position, velocity, and/or acceleration of each mover assembly 108 to move objects to desirable locations while avoiding conflicts, collisions, and so forth. For example, the control/monitoring device 48 may cause the drive circuitry 112 to provide power to different coils of the track sections 104, 106 independently of one another (e.g., to control the coils that are energized and de-energized) to drive movement of the mover assemblies 108 separately from one another. The particular motion profile implemented by the power and control circuitry 114 may typically be implemented upon the design and commissioning of the mover system 100, depending upon the particular task to be performed.

Figure 5:
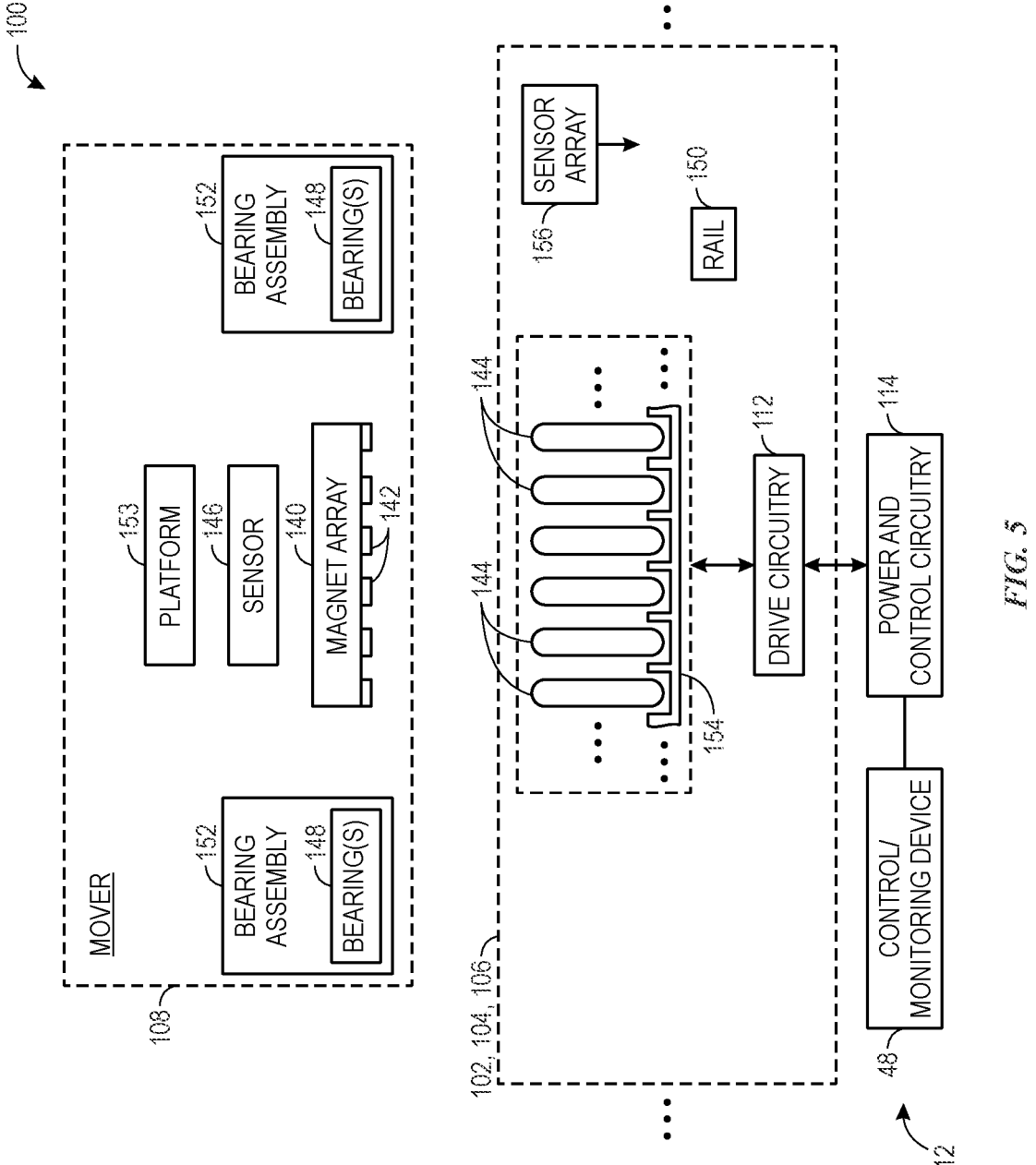
FIG. 5 is a schematic diagram of an embodiment of a mover assembly of a mover system, in accordance with an aspect of the present disclosure.

FIG. 5 is a schematic diagram of an embodiment of the mover system 100 showing one track section 104, 106 and one mover assembly 108 positioned along the track 102. The track 102 illustrated in FIG. 3 may be the straight track section 104 or the curved track section 106, these two differing in their physical configuration. Each mover assembly 108 may include a magnet array 140 on which a number of magnets 142 may be mounted. The magnets 142 may be permanent magnets mounted such that a small air gap is provided between the coils of the track 102 while the mover assembly 108 is mounted to the track 102. The mover assembly 108 may also include a sensor 146 (e.g., the sensor 16) that may monitor various operations associated with the mover assembly 108. For example, the sensor 146 may include a position sensor, an accelerometer, an inertial measurement unit, a distance sensor, a force sensor, and the like that may monitor a position, velocity, acceleration, load, and so forth of the mover assembly 108. The sensor 146 may additionally include a single axis or multiple axes sensor that may monitor vibration of the mover assembly 108 in different axes. The mover assembly 108 may also include bearings 148 and associated components (e.g., rollers) that may interact with rails 150 of the track 102. The bearings 148 and rails 150 may allow the mover assembly 108 to remain securely attached to the track 102 while allowing relatively free movement of the mover assemblies 108 along the track 102 and supporting mechanical loads and forces encountered during motion. Each mover assembly 108 may include any number of bearing assemblies 152 to couple the bearings 148 to a housing of the mover assembly 108. Each mover assembly 108 may further include a respective platform 153 that may support an object for transportation while the mover assemblies 108 move along the track 102.

The track 102 may include a series of parallel coils 144 that are associated with a stator or armature 154. In currently contemplated embodiments, these coils 144 may be mounted into slots in the stator 154, and the stator 154 itself may be made of magnetic material formed into a stack of laminates and structured to allow for mounting within a housing of the track 102. The drive circuitry 112 may be included in each track section 104, 106 to allow for controlled power signals to be applied to the coils 144 in order to drive and position the mover assemblies 108 appropriately around the track 102. A sensor array 156 (e.g., including the sensor 16) is provided in each track section 104, 106. The sensor array 156 may provide feedback that can indicate the position of the mover assemblies 108 and can be used to derive velocity, acceleration, jerk, and other motion parameters. As an example, the sensor array 156 may include a vibration sensor secured to (e.g., at an underside of) the rail 150 to monitor vibration caused by movement of the mover assemblies 108 along the rail 150. In the illustrated embodiment, a number of track sections 104, 106 may be mounted end-to-end and interconnected with one another and/or with the power and control circuitry 114 to receive signals used to power the coils 144.

As will be appreciated by those skilled in the art, multiple track sections 104, 106, along with the magnet arrays 140 of the mover assemblies 108, may generally form the mover system 100. That is, electromotive force is generated by the controlled fields of the coils 144, and interaction between these fields and the magnetic fields of the magnet array 140 serve to drive the mover assembly 108 into desired positions, at desired speeds, and so forth. The coils 144 may be designed in accordance with various configuration strategies, such as ones having the coils 144 arranged around a periphery of the track 102, ones in which the coils 144 are generally planar (in a top or bottom position of the track 102), and so forth. The control/monitoring device 48 may selectively (e.g., independently) cause different coils 144 of different track sections 104, 106 to energize to drive independent movement of the mover assemblies 108, such as to drive a first mover assembly 108 to move at a first speed along a first track section 104, 106 and to drive a second mover assembly 108 to move at a second speed along a second track section 104, 106.

The control/monitoring device 48 may receive different sensor data and determine whether the mover system 100 is operating as desired. For example, the control/monitoring device 48 may compare received sensor data with expected sensor data. A deviation between the received sensor data and the expected sensor data may indicate a deviation from an expected operation (e.g., an identified unexpected operation, an identified anomalous condition, or a discrepancy between an operational state and an expected operation state) of the mover system 100. The comparison between the received sensor data and the expected sensor data may be used to identify devices or machines that are operating in an expected or an unexpected manner. The control/monitoring device 48 may adjust operation of the mover system 100 in response to determining the mover system 100 is operating undesirably. For example, the control/monitoring device 48 may identify devices, equipment, and/or machines for which maintenance or modifying operation may be appropriate based on the received sensor data.

Figure 6:
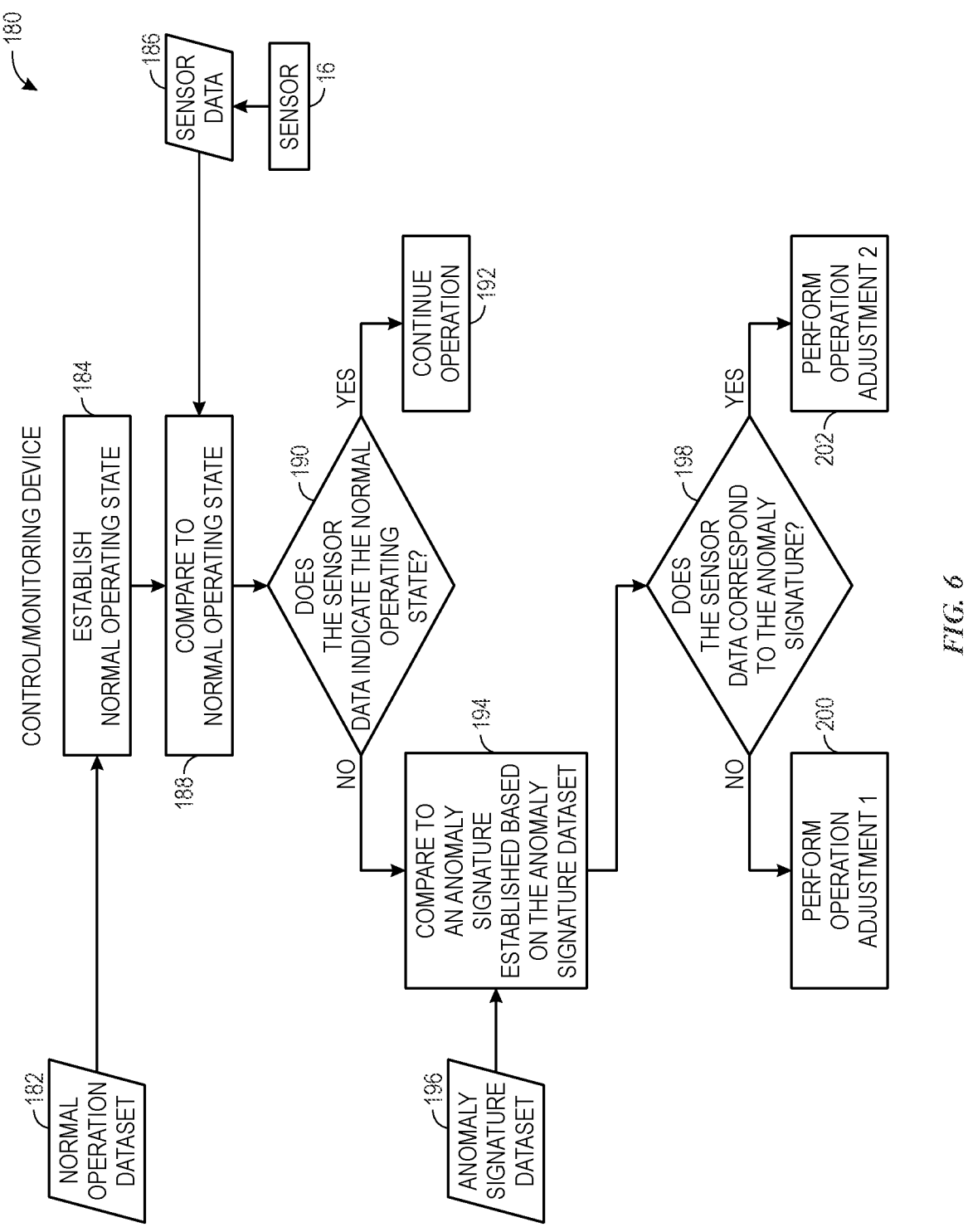
FIG. 6 is a block diagram of an embodiment of a method for monitoring operation of a mover system, in accordance with an aspect of the present disclosure.

With this in mind, FIG. 6 is a block diagram of an embodiment of a method 180 for monitoring and operating the mover system 100. Although the method 180 is described as being performed by the control/monitoring device 48, it should be noted that any suitable computer device capable of communicating with other components in the industrial automation system 10 may perform the disclosed method 180. The control/monitoring device 48 may receive, monitor, or otherwise obtain a normal operation dataset 182 indicative of normal, expected, or target operation of the mover system 100 in which the mover system 100 may operate desirably to transport objects. In other words, a subset of the normal operation dataset 182 may be associated with the normal operating state of the mover system 100.

In some embodiments, the control/monitoring device 48 may operate the mover system 100 during a calibration mode of the mover system 100 in which the mover system 100 is arranged to operate in the normal operating state, and the control/monitoring device 48 may determine the normal operation dataset 182 based on data received from the sensor(s) 16 during the calibration mode. That is, the state data of the mover system 100 in the calibration mode may indicate the normal operating state, and the control/monitoring device 48 may then associate the corresponding data received from the sensor(s) 16 during the calibration mode with the normal operating state based on the state data of the mover system 100. In additional embodiments, the control/monitoring device 48 may receive the normal operation dataset 182 via a user input, and the user input may associate the subset of the normal operation dataset 182 with state data indicative of the normal operating state. By way of example, the normal operation dataset 182 may include any suitable measurement or parameter that provides an indication with regard to operational characteristics of the industrial automation equipment 50, the industrial automation devices 20, or the like. In addition, the normal operation dataset 182 may include data related to the features and operations of the mover assemblies 108 and related equipment of the mover system 100, such as a respective position, position error (e.g., a difference between a current position and a target position), velocity, acceleration, electrical current, vibration, temperature, power consumption, and/or any other suitable parameter of each mover assembly 108.

After receiving the normal operation dataset 182, at block 184, the control/monitoring device 48 may establish a normal operating state of the mover system 100 based on at least a subset of the normal operation dataset 182. That is, the normal operating state may be characterized by the mover system 100 operating based on the normal operation dataset 182. In some embodiments, the normal operating state may correspond to a model, such as a machine learning model, in which patterns of data within the normal operation dataset 182 may be associated with particular operational states (e.g., on, off, percentage capacity, percentage throughput) of the respective industrial automation equipment 50, industrial automation devices 20, or the like.

The control/monitoring device 48 may also receive sensor data 186 from the sensor 16 (e.g., the sensor 146, the sensor array 156) during operation of the mover system 100 after the normal operating state has been established, such as while the mover system 100 actively operates to transport objects via the mover assemblies 108. The sensor data 186 may include measured data received during such operation of the mover system 100, such as data indicative of a respective position, position error (e.g., a difference between a current position and a target position), velocity, acceleration, electrical current, vibration, temperature, power consumption, and/or any other suitable parameter or feature of each mover assembly 108. The control/monitoring device 48 may compare the sensor data 186 to the normal operating state (e.g., to a subset of the normal operation dataset 182), as shown at block 188. For instance, the control/monitoring device 48 may determine whether the sensor data 186 matches the model or the normal operation dataset 182 associated with the normal operating state. In some embodiments, the control/monitoring device 48 may perform feature extraction (e.g., via principle component analysis) of the sensor data 186 to identify features of the mover system 100 indicated by the sensor data 186 to determine correspondence between the current operating state of the mover system 100 and the normal operating state. For example, the control/monitoring device 48 may perform feature extraction by transforming or otherwise analyzing the sensor data 186 to identify the features, such as behavior (e.g., movement, performance) of the mover assemblies 108, operation of any of the circuitry 112, 114, and the like, and the control/monitoring device 48 may compare the extracted features to features corresponding to the normal operating state (e.g., expected features for the normal operating state).

At block 190, the control/monitoring device 48 may determine whether the sensor data 186 indicates the mover system 100 is in the normal operating state based on the comparison between the sensor data 186 and the normal operating state. By way of example, the control/monitoring device 48 may determine whether the sensor data 186, such as an extracted feature of the mover system 100 indicated by the sensor data 186, includes a set of differences from the subset of the normal operation dataset (e.g., a difference between a first value of the sensor data and a second value of the subset of the normal operation dataset is greater than a threshold value), such as a corresponding feature of the mover system 100 indicated by the subset of the normal operation dataset, that is less than a set of thresholds to provide an indication that the mover system 100 is in the normal operating state. At block 192, in response to a determination that the sensor data 186 corresponds to the normal operating state, the control/monitoring device 48 may continue a current operation of the mover system 100.

That is, the control/monitoring device 48 may not adjust operation of the mover system 100 to maintain the normal operating state.

However, in response to a determination (e.g., a set of differences between a first value of the sensor data and a second value of the subset of the normal operation dataset exceeds a set of thresholds) that the sensor data 186 does not correspond to the normal operating state, the control/monitoring device 48 may compare the sensor data 186 to one or more anomaly signatures, as shown at block 194. That is, the control/monitoring device 48 may have previously established the anomaly signatures based on a received anomaly signature dataset 196. The anomaly signatures may be stored in a storage component, a database, or other suitable memory device and may include a model or a collection of data that correlates to the respective equipment or the mover system 100 operating in any state other than the normal operating state. In some embodiments, the control/monitoring device 48 may compare an extracted feature indicated by the sensor data 186 to respective features corresponding to different anomaly states.

At block 198, the control/monitoring device 48 may determine whether the sensor data 186 corresponds to any of the anomaly signatures, such as whether the sensor data 186 (e.g., an extracted feature indicated by the sensor data 186) includes a set of differences from one or more of the anomaly signature datasets 196 (e.g., features corresponding to the anomaly signature datasets 196). That is, the control/monitoring device 48 may determine whether the current operating state of the mover system 100 corresponds to an identified anomaly state. At block 200, in response to determining that the sensor data 186 does not correspond to the anomaly signature (e.g., there is a set of differences between the sensor data 186 and the anomaly signature dataset 196 that is greater than a set of thresholds), the control/monitoring device 48 may perform a first operation adjustment of the mover system 100. As an example, the first operation adjustment may include suspending operation of the mover system 100 or performing some other adjustment to reduce of the potential unknown anomaly state of the mover system 100. Indeed, the control/monitoring device 48 may determine emergence of a new operating state (e.g., a new normal operating state, a new anomaly state) based on the lack of correspondence between the sensor data 186 and the anomaly signature dataset 196 in addition to the lack of correspondence between the sensor data 186 and the normal operating state. Such a new operating state may include a particular feature or set of features identified by the control/monitoring device 48 as different from that of the normal operation dataset 182 and/or of the anomaly signature dataset 196 to cause the control/monitoring device 48 to identify the new operating state as being separate from previously established operating states (e.g., a normal operating state, an anomaly state).

In certain embodiments, the control/monitoring device 48 may have received the anomaly signature dataset 196 from a user input. That is, the user input may provide an indication that the sensor data 186 corresponds to an anomaly state. The user input may also include a name or characterization of the anomaly state. If the user input indicates that the sensor data 186 corresponds to the anomaly state, the control/monitoring device 48 may generate a corresponding anomaly signature dataset 196 during such operation of the mover system 100 and save the anomaly signature dataset 196 in a storage component, database, or the like. The anomaly signature dataset 196 may include at least a portion of the sensor data 186 that represents the current operating parameters or measurements of the mover system 100.

At block 202, in response to determining that the sensor data 186 corresponds to one or more of the anomaly signatures (e.g., the differences between the sensor data 186 and the anomaly signature dataset 196 is less than some threshold), thereby indicating that the current operating state of the mover system 100 may include the identified anomaly state, the control/monitoring device 48 may perform a second operation adjustment of the mover system 100. By way of example, an operation adjustment may be associated with the anomaly signature. Thus, the control/monitoring device 48 may adjust the operation of the mover system 100 in accordance with an associated operation adjustment in response to determining the sensor data 186 corresponds to the anomaly signature. For instance, each of the anomaly signature datasets 196 may be associated with a corresponding operation adjustment to resolve the respective anomaly condition. As such, after determining that the sensor data 186 corresponds to one of the anomaly signatures, the control/monitoring device 48 may query a database or storage component to determine the corresponding operation adjustment to resolve the respective anomaly. The operation adjustment may be provided by user input, determined based on machine learning (e.g., monitored operational adjustments in response to respective anomalies), and the like and may be stored with the anomaly signature dataset 196 or other suitable dataset.

After the control/monitoring device 48 performs the second operation adjustment, the control/monitoring device 48 may receive additional sensor data and determine whether the additional sensor data indicates the anomaly state has been addressed (e.g., the mover system 100 transitions to the normal operating state). For example, the control/monitoring device 48 may compare the additional sensor data to the subset of the normal operation dataset 182. In response to determining that the anomaly state has been addressed upon performing the second operation adjustment, the control/ monitoring device 48 may verify that the anomaly state has been properly identified, such as by confirming correspondence between the sensor data 186 and the anomaly signature and updating the anomaly signature dataset 196 with an increased confidence level or value.

However, in response to determining that the anomaly state has not been addressed upon performing the second operation adjustment, the control/monitoring device 48 may add a new anomaly signature to the anomaly signature dataset 196 and provide a notification to a user device (e.g., the local control system 44), such that the user may provide some insight or characterize the detected anomaly and identify an operation adjustment to resolve the detected anomaly. In some embodiments, a variety of operation adjustments may be applied to the mover system 100 until the anomaly state has been addressed. In this way, the control/monitoring device 48 may use a machine learning algorithm to identify an appropriate operation adjustment that adequately addresses the detected anomaly and store the appropriate operation adjustment with the anomaly signature dataset 196 or the like (e.g., in response to determining such an operation adjustment successfully resolves the detected anomaly). Thus, the control/monitoring device 48 may identify subsequent anomalies of the mover system 100 more accurately to improve operation of the mover system 100.

It should be noted that the control/monitoring device 48 may continually perform the techniques described above during operation of the mover system 100. That is, sensor data 186 may be streamed (e.g., continually received) for comparison to the normal operation dataset 182 and/or to the anomaly signature dataset 196 to determine whether the current operating state of the mover system 100 is the normal operating state, an anomaly state, or a new operating state. The performance of feature extraction with respect to the sensor data 186 may enable the control/monitoring device 48 to distinguish received sensor data 186 from one another for better comparison to the normal operation dataset 182 and/or to the anomaly signature dataset 196. As a result, the control/monitoring device 48 may better reconcile the received sensor data 186 with previously established operating states to determine the operating state of the control/monitoring device 48 more accurately, such as whether a new operating state is in emergence. In an embodiment, the control/monitoring device 48 may mathematically solve a computational problem (e.g., an explicit optimization problem) to select one or more features that include a corresponding distance (e.g., the distance having the largest amplitude) between a new operating state and previously established operating states while ensuring the previously established operating states remain distinct from one another, thereby distinguishing the new operating state and the previously established operating states from one another.

Each of FIGS. 7-10 described below illustrates a respective method or process associated with operation of the mover system 100 for implementing suitable actions based on received data. In some embodiments, each of the methods may be performed by a single respective component or system, such as by the control/monitoring device 48 (e.g., the processor 64). In additional embodiments, multiple components or systems may perform the operations for a single one of the methods. It should also be noted that additional operations may be performed with respect to the described methods. Moreover, certain operations of the depicted methods may be removed, modified, and/or performed in a different order. Further still, the operations of any of the respective methods may be performed in parallel with one another, such at the same time and/or in response to one another.

Figure 7:
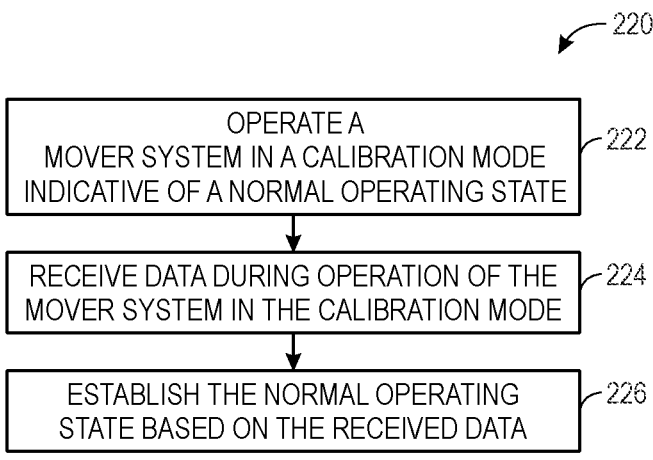
FIG. 7 is a flowchart of an embodiment of a method for calibrating a mover system, in accordance with an aspect of the present disclosure.

FIG. 7 is a flowchart of an embodiment of a method 220 for operating the mover system 100 to establish the normal operating state. At block 222, the control/monitoring device 48 may operate the mover system 100 in a calibration mode to identify the normal operating state. For example, a user (e.g., an operator, a technician) may arrange the mover system 100, such as the track 102, the mover assemblies 108, and/or the objects transported by the mover assemblies 108, in a desirable manner, and the control/monitoring device 48 may operate the mover system 100 during such an arrangement of the mover system 100. Thus, the arrangement of the mover system 100 may be established in the calibration mode when identifying the normal operating state. In addition, during the calibration mode, the components of the mover system 100 may perform certain tasks (e.g., movements between locations) at certain operating parameters that correspond to certain sensor measurements. These operating parameters and corresponding sensor measurements may be designed by the user to characterize the normal operations of the mover system 100. In some embodiments, the control/monitoring device 48 may operate the mover system 100 for a threshold quantity of cycles (e.g., 10-50 cycles, 50-100 cycles, more than 100 cycles) in which the mover assemblies 108 may move and complete a circuit (e.g., a loop) along a path of the track 102 for each cycle.

At block 224, the control/monitoring device 48 may receive data, such as from the sensor 16, during operation of the mover system 100 in the calibration mode. At block 226, the control/monitoring device 48 may establish the normal operating state based on the received data. In certain embodiments, the control/monitoring device 48 may store the received data and associate the received data with the normal operating state based on the received data being acquired during operation in the calibration mode in which the state data of the mover system 100 is indicative of the normal operating state. Upon establishing the normal operating state based on the received data, the control/monitoring device 48 may reference the established normal operating state to determine whether subsequent data being received indicates the normal operating state (e.g., based on a match between the subsequent data and the received data associated with the normal operating state, based on a set of differences between the subsequent data and the received data associated with the normal operating state being less than a threshold).

In certain embodiments, the control/monitoring device 48 may establish different types normal operating states based on different datasets. As an example, the control/monitoring device 48 may operate the mover system 100 in different operating modes to transport objects, such as different operating modes to transport different objects (e.g., objects having different weights), to transport objects in different directions (e.g., along different paths of the track 102), to consume a particular amount of energy (e.g., a low power operating mode), and the like. The control/monitoring device 48 may associate each operating mode with a respective dataset, thereby associating each respective dataset with an associated normal operating state. For example, the control/monitoring device 48 may associate each dataset indicative of a normal operating state with an operating mode based on a user input (e.g., a user input that indicates the operating mode associated with the dataset) and/or based on data received during a calibration mode in which the state data of the mover system 100 is associated with the operating mode. During operation of the mover system 100 in a particular operating mode, the control/monitoring device 48 may select the dataset associated with the particular operating mode for comparison with data being received (e.g., via the sensor 16).

Indeed, datasets used for different operating modes of the normal operating state may include different parameter types. For example, a first dataset indicative of a normal operating state for a first operating mode (e.g., to transport the objects to target destinations) may include the positions of the mover assemblies 108, whereas a second dataset indicative of a normal operating state for a second operating mode (e.g., to transport the objects at a target rate) may include the velocities of the mover assemblies 108. In some embodiments, the control/monitoring device 48 may determine the particular parameter types to be used for the different operating modes. By way of example, the control/monitoring device 48 may initially receive different datasets indicative of a normal operating state for different operating modes. The control/monitoring device 48 may determine that values of a first parameter (e.g., temperature of the mover assemblies 108) may be substantially similar for each of the different datasets, thereby indicating that the first parameter may not distinguish different operating modes from one another. However, the control/monitoring device 48 may determine that values of a second parameter (e.g., positions of the mover assemblies 108) may be substantially different for the different datasets, such as that the values of the second parameter are different for the first operating mode as compared to that of the other operating modes. In response, the control/monitoring device 48 may determine that the second parameter may be more indicative of a normal operating state for the first operating mode, and the control/monitoring device 48 may reference the second parameter in particular (e.g., for comparison with received data) to determine whether the mover system 100 is in the normal operating state of the first operating mode. In this manner, the control/monitoring device 48 may limit or reduce an amount of data or types of parameters used to determine whether the mover system 100 is in a normal operating state. As a result, an amount of computing power, a latency of processing, or other resources used by the control/monitoring device 48 to perform the method 220 may be limited and/or reduced.

In addition to the parameter types, the control/monitoring device 48 may determine other aspects, such as a frequency of data collection (e.g., a sampling rate), a threshold difference value indicative of a non-normal operating state, data output by the control/monitoring device 48 (e.g., to present a display), and so forth, for monitoring the state of the mover system 100. Indeed, the control/monitoring device 48 may utilize different input data, such as a layout of the track 102, a motion profile of the mover assemblies 108, a target speed of the mover assemblies 108, and/or a quantity of the mover assemblies 108 to determine the suitable operations to monitor the mover system 100. In this way, the control/monitoring device 48 may adjust the manner in which the data may be received and/or processed to monitor the mover system 100 more suitably.

The control/monitoring device 48 may also perform the method 220 to establish an anomaly state of the mover system 100 in some embodiments. For example, a user may arrange the mover system 100 in an undesirable manner (e.g., to include a faulty mover assembly 108) in which the state data of the mover system 100 may indicate an anomaly state, and the control/monitoring device 48 may operate the mover system 100 during such an arrangement (e.g., for a threshold quantity of cycles). The control/monitoring device 48 may receive data during operation of the mover system 100 in the undesirable arrangement and establish a signature indicative of an anomaly state based on the data. Indeed, the control/monitoring device 48 may store the data and associate the received data with the signature based on the received data being acquired during undesirable operation in which state data of the mover system 100 is indicative of the anomaly state. The control/monitoring device 48 may then reference the established signature to determine whether subsequent data being received corresponds to the signature (e.g., based on a match between the subsequent data and the received data associated with the signature, based on a set of differences between the subsequent data and the received data associated with the signature being less than a threshold).

It should be noted that a similar method may be performed to enable the control/monitoring device 48 to establish operating states based on other inputs. For example, the mover system 100 (e.g., in the calibration mode, in a separate operation to transport objects via the mover assemblies 108) may receive a user input, query a database, or otherwise acquire information that associates different data to a corresponding operating state. Indeed, such information may be updated (e.g., new user input may be received, a database may be programmatically updated) to enable the control/monitoring device 48 to continually learn or update operating states for comparison with received data.

It should also be noted that the control/monitoring device 48 may perform the method 220 for different embodiments of mover systems 100. For example, different mover systems 100 may have different sensors 16, such as sensors 16 that may monitor different types of parameters. The control/monitoring device 48 may be able to establish the normal operating state for any of the mover systems 100 by using the available sensor data from the sensors 16 implemented in the particular mover system 100. For instance, a first mover system 100 may include first sensors 16 that transmit vibration data and position data, and the control/monitoring device 48 may establish a first normal operating state for the first mover system 100 based on the vibration data and the position data (e.g., based on the vibration data and the position data being received during a calibration mode of the first mover system 100).

A second mover system 100 may include second sensors 16 that transmit temperature data and velocity data, and the control/monitoring device 48 may establish a second normal operating state for the second mover system 100 based on the temperature data and the velocity data (e.g., based on the temperature data and the velocity data being received during a calibration mode of the second mover system 100). A third mover system 100 may include third sensors 16 that also transmit temperature data and velocity data, and the control/monitoring device 48 may establish a third normal operating state for the third mover system 100 based on the temperature data and the velocity data (e.g., based on the temperature data and the velocity data being received during a calibration mode of the second mover system 100), which may be different from that of the second mover system 100. For example, different values of temperature data and/or of velocity data may be received during respective calibrations of the second mover system 100 and of the third mover system 100. Therefore, the third normal operating state for the third mover system 100 may be different than the second normal operating state for the second mover system 100, even though the same types of parameters may be monitored by the sensors 16. In this manner, the control/monitoring device 48 may establish a more suitable normal operating state based on the particular parameter types and/or the particular parameter values associated with the normal operating state of the mover system 100, such as based on data received during an associated calibration mode.

Figure 8:
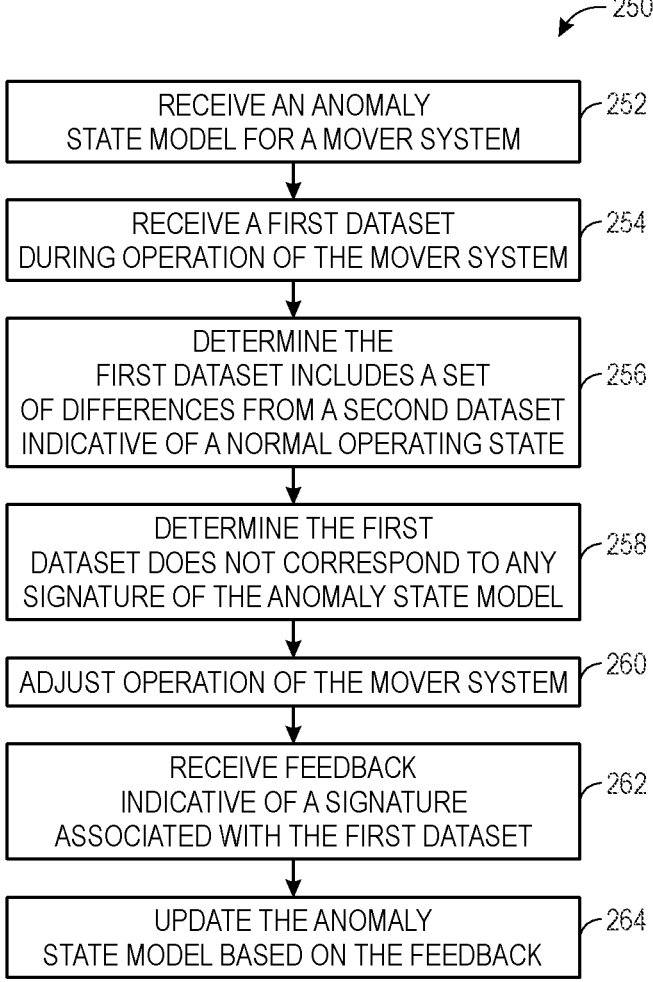
FIG. 8 is a flowchart of an embodiment of a method for monitoring operation of a mover system, in accordance with an aspect of the present disclosure.

FIG. 8 is a flowchart of an embodiment of a method 250 for monitoring operation of the mover system 100. For example, the control/monitoring device 48 may perform the method 250 to determine an anomaly state of the mover system 100 more accurately and to operate the mover system 100 more suitably. At block 252, the control/monitoring device 48 may receive one or more anomaly state models for the mover system 100. The anomaly state models may include various signatures that are indicative of an anomaly state of the mover system 100. For instance, each of the anomaly state models may include some data characteristics (e.g., datasets, anomaly signature datasets 196) associated with an anomaly state of the mover system 100, and such datasets that may include a set of differences from a dataset (e.g., a subset of the normal operation dataset 182) indicative of a normal operating state. As an example, the control/monitoring device 48 may receive the datasets via a user input, and the user input may associate each dataset to a respective signature of an anomaly state. Thus, the control/monitoring device 48 may establish the signatures based on the user input.

As another example, the control/monitoring device 48 may receive the datasets of each signature during operation of the mover system 100 in different anomaly states, and the control/monitoring device may associate each dataset to a signature indicative of a corresponding anomaly state based on previously observed anomalous states using machine learning, pattern analysis, or the like and/or respective datasets from other mover systems 100. Upon establishing the anomaly state model, the control/monitoring device 48 may compare data received during operation of the mover system 100 to the anomaly state model (e.g., to the datasets associated with the signatures) to determine whether the state of the mover system 100 is an anomaly state.

At block 254, the control/monitoring device 48 may receive a first dataset (e.g., the sensor data 186) during operation of the mover system 100 to transport objects via the mover assemblies 108. For example, the control/monitoring device 48 may receive the first dataset from the sensor 16, and the first dataset may indicate any suitable parameter or feature, such as a position, a position error, an electrical current, a velocity, an acceleration, a temperature, a vibration, a power consumption, and/or any other suitable parameter associated with the mover assemblies 108. The control/monitoring device 48 may then compare the first dataset to a second dataset (e.g., the normal operation dataset 182) indicative of a normal operating state of the mover system 100 and/or to the anomaly state model (e.g., the anomaly signature datasets 196) indicative of anomaly states of the mover system 100.

At block 256, based on the comparison between the first dataset and the second dataset indicative of the normal operating state, the control/monitoring device 48 may determine the first dataset includes a set of differences from the second dataset. For example, the first dataset may include a first parameter value that differs from a second parameter value of the second dataset by greater than a threshold value. The first set of differences between the first dataset and the second dataset may indicate that the mover system 100 is not in the normal operating state. As another example, a first feature of the mover system 100 may be extracted or otherwise determined from the first dataset, and the first feature may be different from a second feature corresponding to the normal operating state. Feature extraction may enable the mover system 100 to identify the operating state of the mover system 100 (e.g., to differentiate from other received datasets) more accurately. At block 258, based on the comparison between the first dataset and the anomaly state model, the control/monitoring device 48 may determine that the first dataset does not correspond to any signature of the anomaly state model (e.g., the first dataset, such as the first extracted feature, may include sets of differences from the anomaly signature datasets 196, such as features corresponding to different anomalies). The lack of correspondence between the first dataset and the signatures, as well as the set of differences between the first dataset and the second dataset, may indicate that the mover system 100 is not in any known state. In other words, the mover system 100 may be operating in a new operating state.

At block 260, in response to determining the first dataset includes the set of differences from the second dataset and the first dataset does not correspond to any signature, the control/monitoring device 48 may adjust operation of the mover system 100. By way of example, because the mover system 100 may be operating in an unknown anomaly state as indicated by the set of differences and the lack of correspondence, the control/monitoring device 48 may suspend operation of the mover system 100 to prevent the unknown anomaly state of the mover system 100 from impacting further operation of the mover system 100 and to avoid adjusting operation of the mover system 100 in an undesirable manner without addressing the unknown anomaly state of the mover system 100. In some embodiments, while operation of the mover system 100 is suspended, the control/monitoring device 48 may present an indication, such as by updating a display, transmitting a notification (e.g., to a mobile device of a user), outputting a sound, outputting a visual indicator (e.g., a light), and so forth, to prompt a user to inspect the mover system 100 and address the potentially unknown anomaly state.

At block 262, the control/monitoring device 48 may receive feedback indicative of a signature associated with the first dataset. For example, a user may identify a particular anomaly state (e.g., a fault type, a component at fault) associated with the first dataset and provide a user input that associates the first dataset with a corresponding signature indicative of the particular anomaly state. At block 264, the control/monitoring device 48 may update the anomaly state model based on the feedback and store the updated anomaly state model in a database, storage component, or other suitable memory component. By way of example, the updated anomaly state model may include the signature (e.g., subset of dataset, characteristics in dataset) indicated by the feedback and associated with the first dataset. Thus, the control/monitoring device 48 may determine whether subsequent data received during operation of the mover system 100 may correspond to the newly added signature. In this manner, the control/monitoring device 48 may utilize machine learning to facilitate identification of new anomaly states that may have been previously unknown to the control/monitoring device 48.

By way of example, after updating the anomaly state model to include a new signature, the control/monitoring device 48 may receive a dataset (e.g., the sensor data 186) during operation of the mover system 100 to transport objects. The control/monitoring device 48 may compare the dataset to the anomaly state model and determine that the dataset corresponds to the new signature. In response, the control/monitoring device 48 may determine an adjustment operation based on the new signature and adjust the operation of the mover system 100 in accordance with the adjustment operation. For instance, the new signature may be associated (e.g., by the user input) with a corresponding adjustment operation, and the control/monitoring device 48 may adjust the operation of the mover system 100 in accordance with the corresponding adjustment operation.

The control/monitoring device 48 may also update the anomaly state model in other manners. For example, as discussed herein, the control/monitoring device 48 may receive a user input, query a database, or otherwise receive information that associates a dataset with a signature indicative of an anomaly state without initially receiving such a dataset during operation of the mover system 100 to transport objects. The control/monitoring device 48 may then update the anomaly state model based on the user input. As such, the control/monitoring device 48 may update the anomaly state model without having to adjust, such as suspend, the operation of the mover system 100 (e.g., based on a received dataset including a set of differences from a dataset indicative of a normal operating state, based on a received dataset not corresponding to any signatures of the anomaly state model) before receiving the association of the dataset with the signature. Additionally, the control/monitoring device 48 may receive feedback confirming or verifying that an anomaly state was accurately identified. For instance, the control/monitoring device 48 may determine that dataset received during operation of the mover system

100 to transport objects may correspond to a signature indicative of an anomaly state, and the control/monitoring device 48 may receive feedback that verifies the mover system 100 is in the anomaly state. In response, the control/monitoring device 48 may update the anomaly state model to increase correspondence between the received dataset and the anomaly state (e.g., by increasing confidence in the detected anomaly state). Similarly, the control/monitoring device 48 may also update the anomaly state model to reduce correspondence between the received dataset and the anomaly state (e.g., by reducing confidence in the detected anomaly state) in response to receiving feedback that indicates the anomaly state was incorrectly determined. Thus, the control/monitoring device 48 may continuously update operations for better identification of the operating state of the mover system 100.

In some embodiments, the control/monitoring device 48 may perform a method similar to the method 250 for updating the dataset indicative of a normal operating state. For instance, data associated with a normal operating state may change over time, such as in response to modifications made to the track 102, modifications made to the mover assemblies 108, changes made to the objects being transported by the mover system 100, and the like. Thus, the control/monitoring device 48 may adjust the dataset indicative of a normal operating state to more accurately identify whether the mover system 100 is in the normal operating state. As an example, the control/monitoring device 48 may receive a user input and/or feedback that indicates a dataset is associated with the normal operating state. The control/monitoring device 48 may then update a current dataset indicative of the normal operating state to include the dataset of the feedback in response. As another example, the control/monitoring device 48 may operate the mover system 100 in another calibration mode indicative of the normal operating state, the control/monitoring device 48 may receive updated data during operation of the mover system 100 in the calibration mode, and the control/monitoring device 48 may update the current dataset indicative of the normal operating state to include the updated data in response. As such, the dataset may more accurately indicate a normal operating state of the mover system 100.

FIG. 9 is a flowchart of an embodiment of a method 290 for adjusting operation of the mover system 100 in a particular manner. For example, the method 290 may be performed after establishment of an anomaly state model and/or of a dataset indicative of a normal operating state. At block 292, the control/monitoring device 48 may receive a dataset (e.g., the sensor data 186) during operation of the mover system 100 to transport objects. In some embodiments, the control/monitoring device 48 may perform feature extraction on the received dataset. At block 294, the control/monitoring device 48 may determine that the received dataset corresponds to an anomaly state in which a positioning (e.g., a position, a velocity, an acceleration) of a mover assembly 108 deviates from a target positioning. As an example, the control/monitoring device 48 may determine that the received dataset corresponds to a signature indicative of such an anomaly state. As another example, the control/monitoring device 48 may determine respective positionings of mover assemblies 108 based on the received dataset, compare the respective positionings to corresponding target positionings, and determine the dataset indicates the anomaly state based on a positioning of one of the mover assemblies 108 deviating from its target positioning. To this end, the control/monitoring device 48 may determine the features extracted from the received dataset correspond to features associated with one of the anomaly states.

At block 296, in response to determining that the received dataset indicates an anomaly state in which a positioning of a mover assembly 108 deviates from a target positioning, the control/monitoring device 48 may adjust the operation of the mover system 100 to adjust the positioning of the mover assembly 108. In an example, the control/monitoring device 48 may adjust the operation of the mover system 100 to adjust the positioning of the mover assembly 108 toward the target positioning. Adjustment of the positioning of the mover assembly 108 toward the target positioning may enable the mover system 100 to operate more desirably. In another example, the control/monitoring device 48 may adjust the operation of the mover system 100 to move the mover assembly 108 to an isolated section of the track 102. Positioning of the mover assembly 108 at the isolated section of the track 102 may block the mover assembly 108 (e.g., undesirable positioning of the mover assembly 108) from impacting operation of a remainder of the mover system 100. For instance, the isolated section of the track 102 may be separate from other sections of the track 102 along which other mover assemblies 108 may move during operation of the mover system 100. Thus, the control/monitoring device 48 may continue to operate the other mover assemblies 108 in a desirably manner, such as to drive movement of the other mover assemblies 108 to their respective target positioning, while the mover assembly 108 associated with the anomaly state is at the isolated section.

In some embodiments, in response to determining the dataset indicates an anomaly state in which a positioning of a mover assembly 108 deviates from its target positioning, the control/monitoring device 48 may energize a coil of the track 102 to adjust movement of the mover assembly 108. For example, the control/monitoring device 48 may receive data associated with multiple sections of the track 102 to improve identification of a particular section of the track 102 associated with the anomaly. An identified section of the track 102 may be adjacent to and/or magnetically engaged with the mover assembly 108 that deviates from its target positioning, and the control/monitoring device 48 may energize a coil 144 of the section of the track 102 to adjust the movement of the mover assembly 108. For instance, the control/monitoring device 48 may energize the coil 144 to drive movement of the mover assembly 108 toward its target positioning and/or toward an isolated section of the track 102.

The control/monitoring device 48 may also output an indication of the anomaly state and/or of the adjusted operation of the mover system 100. Such an indication may include any notification, audio indicator, visual indicator, or displayed imagery that may prompt a user to perform an inspection and/or a maintenance operation for the mover system 100. For example, although the adjusted operation of the mover system 100 may address the anomaly state (e.g., by enabling desirable operation of the mover assemblies 108), it may be beneficial for a user to verify that the mover system 100 is operating desirably and/or to prevent occurrence of another anomaly state (e.g., to repair and/or replace a faulty mover assembly 108 associated with the previously occurring anomaly state).

FIG. 10 is a flowchart of an embodiment of a method 320 for presenting information associated with different components of the mover system 100. For example, the control/monitoring device 48 may perform the method 320 to provide information to indicate whether the mover system 100 is in a normal operating state or in an anomaly state. A user (e.g., an operator, a technician) may utilize the presented information to determine whether to perform maintenance and/or inspection on the mover system 100.

At block 322, the control/monitoring device 48 may receive a dataset (e.g., the sensor data 186) during operation of the mover system 100 to transport objects. At block 324, the control/monitoring device 48 may determine a condition of various components of the mover system 100 based on the dataset. For instance, such components may include the mover assemblies 108 (e.g., the magnet array 140, the bearings 148), the sections of the track 102 (e.g., the rail 150, the coils 144), the sensor 16, and so forth. In some embodiments, the control/monitoring device 48 may compare the dataset to the normal operation dataset 182 indicative of the normal operating state and/or to an anomaly state model to determine the condition of various components. For example, based on the comparison, the control/monitoring device 48 may determine that a position of a mover assembly 108 deviates from a target positioning and that the condition of the mover assembly 108 therefore includes an anomaly state. The control/monitoring device 48 may also determine a cause of an anomaly state (e.g., based on a signature corresponding to the dataset and indicating a cause of an anomaly state), such as that a portion of the track 102 (e.g., wear of the rail 150, a dent in the outer periphery 110) may cause the mover assembly 108 to deviate from its target positioning. In certain embodiments, the control/monitoring device 48 may perform feature extraction of the received dataset to determine the condition of the components, such as to determine whether the features extracted from the received dataset correspond to features associated with a dataset (e.g., the normal operation dataset 182, the anomaly signature dataset 196) and identify a condition therefrom.

At block 326, the control/monitoring device 48 may present a display (e.g., via the display 76) providing a visual indicator for each component of the mover system 100, and each visual indicator may indicate the condition for the corresponding component. For example, each visual indicator may depict whether each component is in a normal operating state, in an anomaly state, and/or between the normal operating state and the anomaly state (e.g., transitioning from the normal operating state toward the anomaly state). In this manner, a user may easily visualize the condition of the mover system 100 via the visual indicators, such as by determining whether any of the components of the mover system 100 are in the anomaly state.

At block 328, the control/monitoring device 48 may receive a selection of one of the visual indicators being presented. By way of example, the control/monitoring device 48 may receive the selection via a user input, which may be provided via the HMI 46, the display 76, or any other suitable user interface (e.g., a button, a trackpad, a mouse, a mobile device, a switch, a dial). At block 330, the control/monitoring device 48 may present additional information for the component associated with the selected visual indicator. As an example, the control/monitoring device 48 may present additional information regarding the condition of the component, such as the particular anomaly state or fault (e.g., deviation from a target positioning, speed below a threshold speed), a potential cause of an anomaly state (e.g., wear of the component, wear of a different component), a timestamp of a detected anomaly state, predicted health (e.g., a predicted amount of time before transition from the normal operating state to an anomaly state, a predicted upcoming anomaly state), and the like. As another example, the control/monitoring device 48 may present other relevant information regarding the component, such as a model of the component, historical information (e.g., previously identified anomaly states), a real-time operating parameter (e.g., a position, a speed, an acceleration), and the like. In this manner, the user may obtain more specific information regarding any of the components by selecting the corresponding visual indicator. For instance, the user may select one of the visual indicators (e.g., corresponding to a mover assembly 108) to determine how to address a particular anomaly state (e.g., to replace and/or repair the mover assembly 108).

The control/monitoring device 48 may dynamically update the information being provided. For example, the control/monitoring device 48 may determine the condition and/or update presentation of the visual indicators at a particular frequency, which may depend on various parameters associated with the mover system 100 (e.g., a layout of the track 102, a motion profile of the mover assemblies 108, a target speed of the mover assemblies 108, a quantity of the mover assemblies 108) to present update or refresh information at a useful rate to a user. In this manner, the visual indicators presented via the control/monitoring device 48 may more accurately represent the condition of the mover system 100.

In some embodiments, the control/monitoring device 48 may provide the visual indicators as coordinate points in a coordinate system (e.g., a two-dimensional (2-D) coordinate system, a three-dimensional (3-D) coordinate system). For example, the control/monitoring device 48 may position or group coordinate points in a cluster more proximate to one another (e.g., having smaller distances between one another) for components having relatively similar conditions (e.g., an extent of a normal operating state, an extent of an anomaly state, a type of anomaly state). The control/monitoring device 48 may distribute coordinate points farther away from one another (e.g., having larger distances between one another) for components having relatively different conditions. As such, the distances between coordinate points may be inversely related to the similarity between conditions of corresponding components. Thus, a user may view the relative positions of the coordinate points to determine the relative conditions of components.

The coordinate system may also have various regions, such as a region indicative of a normal operating state and/or one or more regions indicative of an anomaly state (e.g., a respective region for a different type of anomaly state). The control/monitoring device 48 may position the coordinate points with respect to the regions based on the condition of a corresponding component. As an example, for a component in a normal operating state, the control/monitoring device 48 may position the corresponding coordinate point in the region associated with the normal operating state. As another example, for a component in an anomaly state, the control/monitoring device 48 may position the corresponding coordinate point in the region associated with the anomaly state. As a further example, for a component transitioning between a normal operating state and an anomaly state, the control/monitoring device 48 may position the corresponding coordinate point near a border between the region associated with the normal operating state and the region associated with the anomaly state.

In such an embodiment, each coordinate point may be selectable by the user, and the control/monitoring device 48 may present additional information associated with the component corresponding to a selected coordinate point. Indeed, such additional information may be blocked from presentation until selection to avoid overwhelming the user with excessive information. For example, the positioning of the coordinate points with respect to one another in the coordinate system may be more apparent or visible to the user without presentation of the additional information until selection of one of the coordinate points.

In additional embodiments, the control/monitoring device 48 may provide the visual indicators as 3-D models representative of the real-world appearance of the corresponding components of the mover system 100. For example, the visual indicators may be positioned with respect to one another to form an overall 3-D model having a digital or virtual appearance of the mover system 100. The control/monitoring device 48 may adjust an appearance of the 3-D models to indicate the condition for corresponding components. For instance, the control/monitoring device 48 may present a 3-D model in a first color (e.g., a green color) to indicate a corresponding component in a normal operating state, present a 3-D model in a second color (e.g., a red color) to indicate a corresponding component in an anomaly state, and present a 3-D model in a third color (e.g., an orange color) to indicate a corresponding component transitioning between the normal operating state and the anomaly state. Each 3-D model may also be selectable by a user, and the control/monitoring device 48 may present additional information associated with the component corresponding to a selected 3-D model.

In further embodiments, the control/monitoring device 48 may present the visual indicators via a table. For example, each visual indicator may be presented as an entry of the table with a condition of a corresponding component presented as text (e.g., in an adjacent entry of the table). The entries of the table may be selectable, and the control/monitoring device 48 may present additional text associated with additional information for a corresponding component upon selection of one of the entries.

Indeed, the control/monitoring device 48 may present the visual indicators in any suitable manner, such as via a chart (e.g., a pie chart), a graph, written text, and the like. In some embodiments, the control/monitoring device 48 may switch between different manners in which the visual indicator is to be presented. As an example, the control/monitoring device 48 may present the visual indicators in a particular manner based on a user input, which may include a request to present the visual indicators in the particular manner.

In some embodiments, the user may provide a user input (e.g., via the display) to indicate whether the visual information of the condition of the components, including the visual indicator and/or the additional information, being presented is accurate. The control/monitoring device 48 may then update the normal operation dataset 182 and/or the anomaly state model based on the user input. For example, the user may inspect the components of the mover system 100, compare the inspected condition of the components with the presented visual information, and provide the user input based on the comparison. In response to determining the user input indicates the visual information is accurate, a confidence level associated with correspondence between the dataset and the condition of the components may be increased. However, in response to determining the user input indicates the visual information is inaccurate, the normal operation dataset 182 and/or the anomaly state model may be adjusted to reduce correspondence between the dataset and the determined condition of the components and/or to associate the dataset with a different condition of the components (e.g., a condition indicated by the user input). Thus, the visual information being presented may facilitate receipt of feedback that helps the control/monitoring device 48 determine the condition of components of the mover system 100 more accurately.

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium comprising instructions that, when executed by processing circuitry, are configured to cause the processing circuitry to perform operations comprising:

receiving a first dataset associated with a mover system comprising a track and a plurality of mover assemblies, wherein each mover assembly comprises one or more magnets configured to cause the mover assembly to independently move along the track based on an electromagnetic force provided via one of more coils integrated within the track, wherein the first dataset is associated with calibrating the mover system for a plurality of operating modes, wherein the mover system is calibrated for each of the plurality of operating modes with respect to different types of objects to be transported on the plurality of mover assemblies, different movement directions of the plurality of mover assemblies, and a level of energy output of the mover system;

identifying a baseline operating state for each operating mode of the plurality of operating modes based on one or more parameters included in the first dataset;

receiving a second dataset associated with the mover system after receiving the first dataset, wherein the second dataset corresponds to the mover system operating in at least two different operating modes;

identifying a plurality of features within the second dataset, wherein the plurality of features is associated with the mover system operating in a first operating mode and a second operating mode, wherein the first operating mode is different from the second operating mode;

identifying a portion of the plurality of features that correspond to the mover system operating in the first operating mode or the second operating mode;

determining that the mover system is operating according to the first operating mode based on the portion of the plurality of features;

identifying an anomaly signature dataset of a plurality of anomaly signature datasets that is present in the second dataset, wherein the plurality of anomaly signature datasets is identified based on a machine learning model trained using the first dataset and a plurality of anomaly states associated with the first dataset, and wherein each anomaly signature dataset of the plurality of anomaly signature datasets corresponds to an operating mode of the plurality of operating modes;

determining that the second dataset is indicative of an anomaly state of the mover system based on the anomaly signature dataset being present in the second dataset and an indication that the mover system is operating according to the first operating mode;

determining an operational adjustment for the mover system based on the anomaly state, wherein each of the plurality of anomaly signature datasets is associated with a respective operational adjustment of a plurality of operational adjustments for the mover system; and adjusting an operation of the mover system based on the operational adjustment associated with the anomaly signature dataset, wherein the operation is adjusted to cause at least one mover assembly of the plurality of movers assemblies to change a direction, a velocity, or an acceleration by selectively energizing the one or more coils integrated within the track, wherein each mover assembly of the plurality of mover assemblies is configured to move based on the one or more coils of the track being energized.

2. The non-transitory computer-readable medium of claim 1, wherein the instructions corresponding to determining that the second dataset is indicative of the anomaly state comprises additional instructions configured to cause the processing circuitry to:

determine that a positioning of a mover assembly deviated from a target positioning; and adjusting the operation of the mover system to adjust movement of the mover assembly in response to determining the positioning of the mover assembly deviated from the target positioning.

3. The non-transitory computer-readable medium of claim 1, wherein the first dataset is received via at least one sensor while operating the mover system in a calibration mode.

4. The non-transitory computer-readable medium of claim 1, wherein the instructions, when executed by the processing circuitry, are configured to cause the processing circuitry to perform operations comprising:

receiving a third dataset during the operation of the mover system, wherein the third dataset comprises a set of differences from the first dataset;

determining that the third dataset does not correspond to the anomaly signature dataset; and suspending operation of the mover system in response to determining that the third dataset comprises the set of differences from the first dataset and that the third dataset does not correspond to any anomaly signature datasets of the plurality of anomaly signature datasets.

5. The non-transitory computer-readable medium of claim 1, wherein the instructions, when executed by the processing circuitry, are configured to cause the processing circuitry to perform the operations comprising:

receiving a third dataset during operation of the mover system;

determining a set of differences between the third dataset and the first dataset is less than a set of thresholds; and continuing the operation of the mover system in response to determining the set of differences between the third dataset and the first dataset is less than the set of thresholds.

6. The non-transitory computer-readable medium of claim 1, wherein the instructions, when executed by the processing circuitry, are configured to cause the processing circuitry to perform the operations comprising:

determining that the mover system is operating in a new operating state based on the second dataset comprising a set of differences from the first dataset;

suspending the operation of the mover system based on the new operating state; and receiving an indication classifying the new operating state as an anomaly signature dataset.

7. The non-transitory computer-readable medium of claim 1, wherein the first dataset comprises an electrical current associated with each of the plurality of mover assemblies, a temperature of each of the plurality of mover assemblies, a power consumption of each of the plurality of mover assemblies, or any combination thereof.

8. A method, comprising:

receiving, via processing circuitry, an anomaly state model for a mover system comprising a track and a plurality of mover assemblies movable along the track, wherein each mover assembly comprises one or more magnets configured to cause the mover assembly to independently move along the track based on an electromagnetic force provided via one of more coils integrated within the track, wherein the anomaly state model comprises a plurality of signatures, and each signature of the plurality of signatures is indicative of the mover system operating in an operating mode of a plurality of operating modes, an anomaly state of the mover system, and an operational adjustment for the mover system, wherein the mover system is calibrated for each of the plurality of operating modes with respect to different types of objects to be transported on the plurality of mover assemblies, different movement directions of the plurality of mover assemblies, and a level of energy output of the mover system, wherein the anomaly state model is generated based on a sensor dataset associated with calibrating the plurality of mover assemblies to operate in the plurality of operating modes and a machine learning model trained to identify each of the plurality of signatures based on one or more patterns within the sensor dataset, and wherein each of the plurality of signatures is associated with a respective operational adjustment of a plurality of operational adjustments for the mover system;

identifying, via the processing circuitry, a baseline operating state for each operating mode of the plurality of operating modes based on one or more parameters included in the sensor dataset;

receiving, via the processing circuitry, an additional sensor dataset during operation of the mover system, wherein the additional sensor dataset is acquired after the sensor dataset, wherein the additional sensor dataset corresponds to the mover system operating in at least two different operating modes;

identifying a plurality of features within the additional sensor dataset, wherein the plurality of features is associated with the mover system operating in a first operating mode and a second operating mode, wherein the first operating mode is different from the second operating mode;

identifying a portion of the plurality of features that correspond to the mover system operating in the first operating mode or the second operating mode;

determining that the mover system is operating according to the first operating mode based on the portion of the plurality of features;

determining, via the processing circuitry, the additional sensor dataset corresponds to a signature of the plurality of signatures of the anomaly state model;

determining, via the processing circuitry, an adjustment operation of the mover system based on the signature and an indication that the mover system is operating according to the first operating mode; and adjusting, via the processing circuitry, the operation of the mover system by causing at least one mover assembly of the plurality of mover assemblies to perform a change in a direction, a velocity, or an acceleration by selectively energizing one or more coils within the track, wherein each mover assembly of the plurality of mover assemblies is configured to move based on the one or more coils of the track being energized in accordance with the adjustment operation.

9. The method of claim 8, comprising receiving, via the processing circuitry, a normal operation dataset associated with the mover system, wherein a subset of the normal operation dataset is associated with a normal operating state of the mover system, and each signature of the plurality of signatures of the anomaly state model is associated with a respective anomaly dataset comprising a set of differences from the subset of the normal operation dataset.

10. The method of claim 9, comprising:

determining, via the processing circuitry, a first set of differences between the additional sensor dataset and the normal operation dataset;

determining, via the processing circuitry, the first set of differences does not correspond to the plurality of signatures; and suspending, via the processing circuitry, the operation of the mover system in response to determining the first set of differences does not correspond to the plurality of signatures.

11. The method of claim 10, comprising:

receiving, via the processing circuitry, feedback indicative of an additional signature associated with the additional sensor dataset; and adjusting, via the processing circuitry, the anomaly state model to include the additional signature upon receiving the feedback.

12. The method of claim 11, comprising:

receiving, via the processing circuitry, a subsequent sensor dataset during the operation of the mover system;

determining, via the processing circuitry, the subsequent sensor data corresponds to the additional signature;

determining, via the processing circuitry, an additional adjustment operation of the mover system based on the additional signature; and adjusting, via the processing circuitry, the operation of the mover system in accordance with the additional adjustment operation.

13. The method of claim 8, comprising:

receiving, via the processing circuitry, information associating a new sensor dataset with a new signature indicative of a new anomaly state of the mover system; and updating, via the processing circuitry, the anomaly state model to include the new signature in response to receiving the information.

14. The method of claim 8, wherein the sensor dataset is received from one or more sensors coupled to the track and configured to record vibrations caused by a movement of the plurality of mover assemblies.

15. A mover system, comprising:

a track comprising a plurality of coils;

a plurality of mover assemblies, wherein each mover assembly of the plurality of mover assemblies comprises one or more magnets configured to cause the mover assembly to independently move along the track based on an electronic magnetic force provided by magnetically engaging with a coil of the plurality of coils of the track; and control circuitry configured to perform operations comprising:

receiving a first dataset associated with calibrating the plurality of mover assemblies to move along the track in a plurality of operating modes, wherein the mover system is calibrated for each of the plurality of operating modes with respect to different types of objects to be transported on the plurality of mover assemblies, different movement directions of the plurality of mover assemblies, and a level of energy output of the mover system;

identifying a baseline operating state for each operating mode of the plurality of operating modes based on one or more parameters included in the first dataset;

receiving a second dataset during operation of the mover system, wherein the second dataset is received after the first dataset, and wherein the second dataset corresponds to the mover system operating in at least two different operating modes;

identifying a plurality of features within the second dataset, wherein the plurality of features is associated with the mover system operating in a first operating mode and a second operating mode, wherein the first operating mode is different from the second operating mode;

identifying a portion of the plurality of features that correspond to the mover system operating in the first operating mode or the second operating mode;

determining that the mover system is operating according to the first operating mode based on the portion of the plurality of features;

identifying an anomaly signature dataset of a plurality of anomaly signature datasets that is present in the second dataset, wherein the plurality of anomaly signature datasets is identified based on a machine learning model trained using the first dataset and a plurality of anomaly states associated with the first dataset, and wherein each anomaly signature dataset of the plurality of anomaly signature datasets corresponds to an operating mode of the plurality of operating modes;

determining that the second dataset corresponds to an anomaly state of the mover system based on the anomaly signature dataset being present in the second dataset;

determining an operational adjustment for the mover system based on the anomaly signature dataset and an indication that the mover system is operating according to the first operating mode; and adjusting an operation of the mover system based on the operational adjustment associated with the anomaly signature dataset, wherein the operation is adjusted to cause at least one mover assembly of the plurality of movers assemblies to change a direction, a velocity, or an acceleration by selectively energizing at least one of the plurality of coils to drive movement of at least one of the plurality of mover assemblies along the track.

16. The mover system of claim 15, wherein the control circuitry is configured to perform operations comprising:

receiving a third dataset;

establishing the anomaly signature dataset based on the third dataset; and determining the second dataset corresponds to the anomaly signature dataset in response to determining a set of differences between the second dataset and the third dataset is less than a threshold.

17. The mover system of claim 15, wherein the control circuitry is configured to perform operations comprising:

determining a respective condition of the track, of each mover assembly of the plurality of mover assemblies, or both based on the second dataset;

presenting a plurality of visual indicators, wherein each visual indicator of the plurality of visual indicators corresponds to a section of the track or to a mover assembly of the plurality of mover assemblies; and adjust an appearance of each visual indicator of the plurality of visual indicators based on the respective condition of a corresponding section of the track or a corresponding mover assembly.

18. The mover system of claim 17, wherein the control circuitry is configured to perform operations comprising:

receiving a user input indicative of a selection of a visual indicator of the plurality of visual indicators; and presenting additional information associated with the section of the track or associated with the mover assembly corresponding to the visual indicator in response to receiving the user input.

19. The mover system of claim 15, wherein the anomaly state corresponding to the anomaly signature dataset is associated with a positioning of a mover assembly deviating from a target positioning, and the control circuitry is configured to selectively energize a particular coil of the plurality of coils of the track to adjust movement of the mover assembly in response to determining the anomaly state is associated with the positioning of the mover assembly deviating from the target positioning.

20. The mover system of claim 15, wherein calibrating the plurality of mover assemblies to move along the track comprises moving the plurality of mover assemblies upon the track for a threshold number of cycles.

* * * * *